US012602637B2

(12) United States Patent
Shaaban et al.

(10) Patent No.: US 12,602,637 B2
(45) Date of Patent: Apr. 14, 2026

(54) SYSTEMS AND METHODS FOR CLIENT INTAKE AND MANAGEMENT USING RISK PARAMETERS

(71) Applicant: ACI Holdings Ltd., Chicago, IL (US)

(72) Inventors: Ahmed Farouk Shaaban, South Barrington, IL (US); Venkat Thandra, South Barrington, IL (US); Dino Eliopulos, South Barrington, IL (US); Andrew Kenneth Blazaitis, Rochester, MN (US); Kennedy Muthukrishnan, South Barrington, IL (US)

(73) Assignee: ACI Holdings Ltd., Chicago, IL (US)

( * ) Notice: Subject to any disclaimer, the term of this patent is extended or adjusted under 35 U.S.C. 154(b) by 75 days.

(21) Appl. No.: 17/716,791

(22) Filed: Apr. 8, 2022

(65) Prior Publication Data

US 2023/0009561 A1     Jan. 12, 2023

Related U.S. Application Data

(60) Provisional application No. 63/219,855, filed on Jul. 9, 2021.

(51) Int. Cl.
 G06Q 10/0635      (2023.01)
 G06F 16/28       (2019.01)
    (Continued)

(52) U.S. Cl.
 CPC ....... G06Q 10/0635 (2013.01); G06F 16/282 (2019.01); G06F 16/9035 (2019.01); G06Q 50/18 (2013.01)

(58) Field of Classification Search
 None
 See application file for complete search history.

(56) References Cited

U.S. PATENT DOCUMENTS 10,796,383 B2    10/2020  Shaaban et al.
10,896,470 B2     1/2021  Shaaban et al.
         (Continued)

FOREIGN PATENT DOCUMENTS

WO     2016004123 A1    1/2016
WO     2016004126 A1    1/2016
         (Continued)

OTHER PUBLICATIONS

Aires, "Norm Conflict Identification Using a Convolutional Neural Network," Apr. 2021, In International Workshop on Coordination, Organizations, Institutions, Norms, and Ethics for Governance of Multi-Agent Systems, Springer International Publishing, pp. 3-19. (Year: 2021).*

(Continued)

*Primary Examiner* — Stephanie Z Delich
(74) *Attorney, Agent, or Firm* — Spencer Fane, LLP

(57)            ABSTRACT

Systems and methods for client intake and management are disclosed herein. In an. embodiment, a method for client intake and management by a first party includes receiving initial client data regarding a second party from at least one user terminal, retrieving additional client data regarding the second party from at least one of the second party, an existing second party database, or a third party data source, extracting target data from the additional client data, generating at least one risk parameter based on the target data, and determining a risk associated with the second party based on the at least one risk parameter.

16 Claims, 13 Drawing Sheets

(51) Int. Cl.
*G06F 16/9035* (2019.01)
*G06Q 50/18* (2012.01)

(56) References Cited

U.S. PATENT DOCUMENTS

| | | |
|---|---|---|
| 11,138,566 B2 | 10/2021 | Shaaban et al. |
| 11,144,583 B2 | 10/2021 | Shaaban et al. |
| 11,714,919 B2 * | 8/2023 | Maduranthakam Kidambi Sridhar ............... G06F 21/6272 726/30 |
| 2005/0055308 A1 * | 3/2005 | Meyer ............... G06Q 10/0635 705/38 |
| 2006/0117012 A1 * | 6/2006 | Rizzolo ................. G06Q 10/06 707/999.009 |
| 2008/0071578 A1 | 3/2008 | Herz |
| 2011/0093453 A1 | 4/2011 | Frayman et al. |
| 2011/0208770 A1 | 8/2011 | Snider |
| 2013/0144681 A1 | 6/2013 | Quast |
| 2014/0278730 A1 | 9/2014 | Muhart |
| 2016/0125511 A1 | 5/2016 | Shaaban et al. |
| 2016/0140528 A1 | 5/2016 | Shaaban et al. |
| 2016/0203530 A1 | 7/2016 | Shaaban et al. |
| 2016/0210572 A1 | 7/2016 | Shaaban et al. |
| 2017/0004550 A1 | 1/2017 | Shaaban et al. |
| 2017/0109834 A1 | 4/2017 | Shaaban et al. |
| 2018/0121445 A1 | 5/2018 | Majaniemi |
| 2018/0285886 A1 | 10/2018 | Yan |
| 2019/0066057 A1 | 2/2019 | Shaaban et al. |
| 2019/0156385 A1 | 5/2019 | Shaaban et al. |
| 2019/0279161 A1 | 9/2019 | Shaaban et al. |
| 2019/0279179 A1 | 9/2019 | Shaaban et al. |
| 2020/0242526 A1 * | 7/2020 | Sampath .......... G06Q 10/06393 |
| 2021/0012290 A1 | 1/2021 | Shaaban et al. |
| 2021/0042378 A1 | 2/2021 | Shaaban et al. |
| 2021/0043100 A1 | 2/2021 | Shaaban et al. |
| 2021/0049535 A1 | 2/2021 | Shaaban et al. |
| 2021/0049714 A1 | 2/2021 | Shaaban et al. |
| 2021/0075615 A1 | 3/2021 | Shaaban et al. |
| 2021/0100375 A1 | 4/2021 | Shaaban et al. |
| 2022/0121881 A1 | 4/2022 | Shaaban et al. |
| 2022/0300653 A1 * | 9/2022 | Wrenn ................ G06F 21/6272 |

FOREIGN PATENT DOCUMENTS

| | | |
|---|---|---|
| WO | 2016004127 A1 | 1/2016 |
| WO | 2016004128 A1 | 1/2016 |
| WO | 2016004129 A1 | 1/2016 |
| WO | 2016004132 A1 | 1/2016 |
| WO | 2016004133 A1 | 1/2016 |
| WO | 2016004135 A1 | 1/2016 |
| WO | 2016004138 A2 | 1/2016 |
| WO | 2016004445 A1 | 1/2016 |
| WO | 2016007334 A1 | 1/2016 |
| WO | 2016018632 A1 | 2/2016 |
| WO | 2016029194 A1 | 2/2016 |
| WO | 2018045126 A1 | 3/2018 |
| WO | 2019036310 A1 | 2/2019 |
| WO | 2022086813 A1 | 4/2022 |

OTHER PUBLICATIONS

International Search Report and Written Opinion issued Sep. 9, 2022 in corresponding International Application No. PCT/US22/31616.

International Search Report and Written Opinion issued Sep. 8, 2022 in corresponding International Application No. PCT/US22/31619.

Extended European Search Report issued in EP22838207, dated Apr. 3, 2025, 8 pages.

Extended European Search Report issued in EP22838208, dated Apr. 3, 2025, 9 pages.

Office Action (Non-Final Rejection) dated Feb. 12, 2025 for U.S. Appl. No. 17/716,800 (pp. 1-32).

* cited by examiner

SYSTEMS AND METHODS FOR CLIENT INTAKE AND MANAGEMENT USING RISK PARAMETERS

PRIORITY

This application claims priority to U.S. Provisional Application No. 63/219,855, filed Jul. 9, 2021, entitled "Systems and Methods for Client Intake and Management", the entire contents of which is incorporated herein by reference and relied upon.

BACKGROUND

Technical Field

This disclosure generally relates to systems and methods for client intake and management. More specifically, the present disclosure relates to systems and methods for determining and managing client conflicts and/or risks.

Background Information

Various client intake tools exist. However, existing systems typically rely on personal knowledge of any risk associated with a potential client, for example, the potential client's willingness and ability to pay bills on time and in full. Existing systems also take significant time to complete a conflict check, often 24 hours, and require significant human intervention and research to complete.

SUMMARY

It has been discovered that a system for determining client risk and managing clients based thereon is desired. A first aspect of the present disclosure is to provide a method for client intake and management by a first party. The method includes receiving initial client data regarding a second party from at least one user terminal, retrieving additional client data regarding the second party from at least one of the second party, an existing second party database, or a third party data source, extracting target data from the additional client data, generating at least one risk parameter based on the target data, and determining a risk associated with the second party based on the at least one risk parameter.

A second aspect of the present disclosure is to provide a system for client intake and management by a first party. The system includes at least one user terminal and a central server. The at least one user terminal includes a user input device configured to receive initial client data regarding a second party. The central server includes a processor and a memory. The processor is programmed to execute instructions stored on the memory to cause the central server to: (i) receive the initial client data from the at least one user terminal; (ii) retrieve additional client data regarding the second party from at least one of the second party, an existing second party database, or a third party data source; (iii) extract target data from the additional client data; (iv) generate at least one risk parameter based on the target data; and (v) determine a risk associated with the second party based on the at least one risk parameter.

A third aspect of the present disclosure is to provide another method for client intake and management by a first party. The method includes receiving initial client data regarding a second party from at least one user terminal, the initial client data including a name of the second party and at least one selection, determining a conflict rating using hierarchical searching on a matter database using the initial client data and the at least one selection, and causing an adjustment to a user interface on a user terminal based on the conflict rating.

A fourth aspect of the present disclosure is to provide another system for client intake and management by a first party. The system includes a memory and a processor. The memory stores a matter database. The processor is programmed to execute instructions stored on the memory to cause the processor to: (i) receive initial client data regarding a second party from at least one user terminal, the initial client data including a name of the second party and at least one selection; (ii) determine a conflict rating using hierarchical searching on the matter database using the initial client data and the at least one selection; and (iii) cause an adjustment to a user interface on a user terminal based on the conflict rating A fifth aspect of the present disclosure is to provide another system for client intake and management by a first party. The system includes at least one user terminal and a central server. The at least one user terminal including a user interface and a user input device, the user input device configured to receive initial client data regarding a second party. The central server includes a processor and a memory. The processor is programmed to execute instructions stored on the memory to cause the central server to: (i) receive initial client data regarding a second party from the at least one user terminal, the initial client data including a name and at least one selection; (ii) determine a conflict rating using hierarchical searching on a matter database using the initial client data and the at least one selection; (iii) cause an adjustment to the user interface based on the conflict rating.

Other objects, features, aspects and advantages of the systems and methods disclosed herein will become apparent to those skilled in the art from the following detailed description, which, taken in conjunction with the annexed drawings, discloses exemplary embodiments of the disclosed systems and methods.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
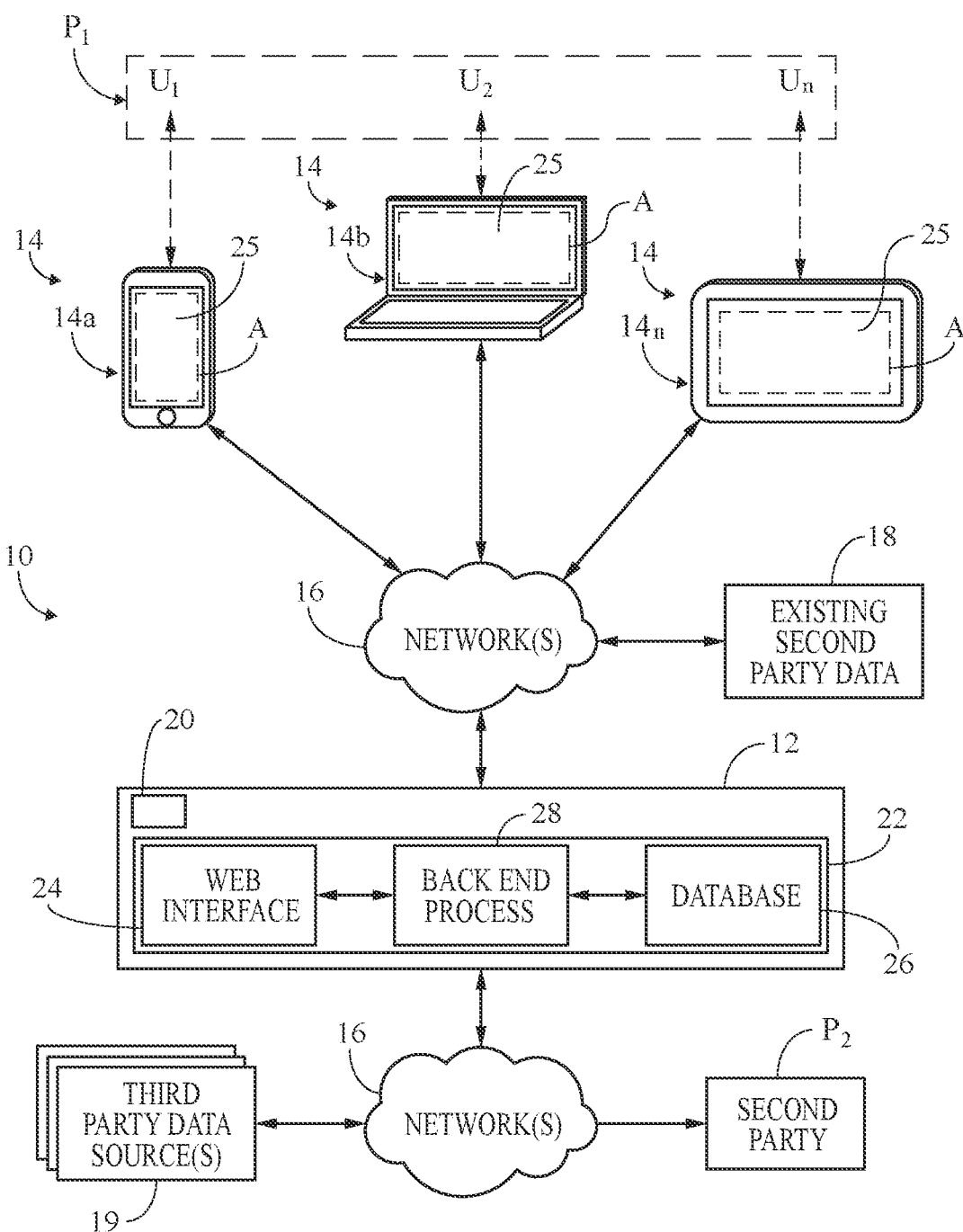
FIG. 1 illustrates an example embodiment of a system for client intake and management in accordance with the present disclosure.

FIG. 1 illustrates an example embodiment of a system 10 for client intake and management. In the illustrated embodiment, the system 10 includes a central server 12 and one or more user terminals 14 operated by one or more users $U_1$, $U_2$ . . . $U_n$ of a first party $P_1$. In use, the central server 12 is configured to wirelessly communicate with each of the user terminals 14 via a network 16 to manage the first party $P_1$'s intake and management of one or more clients. The one or more clients are referred to herein as second parties $P_2$. Using the system 10, any user $U_1$, $U_2$ . . . $U_n$ of a first party $P_1$ can obtain a quick conflict check regarding one or more second party $P_2$ using their respective user terminal 14, without the need for any other human intervention or additional research. Any user $U_1$, $U_2$ . . . $U_n$ of a first party $P_1$ can also perform a risk assessment regarding one or more second party $P_2$ using their respective user terminal 14.

Each of the plurality of user terminals 14 can be, for example, a cellular phone, a tablet, a personal computer, or another electronic device. Here, the plurality of user terminals 14 includes a first user terminal 14a, a second user terminal 14b, and an nth user terminal 14n. Each user terminal 14 can be controlled by a distinct user $U_1$, $U_2$ . . . $U_n$ (e.g., a first user $U_1$ controls the first user terminal 14a, a second user $U_2$ controls the second user terminal 14b, and an nth user $U_n$ controls the nth user terminal 14n). The user of each user terminal 14 can be, for example, a member or employee of the first party $P_1$. As used herein, each of the users $U_1$, $U_2$ . . . $U_n$ can also be referred to generally as a user U. The first party $P_1$ can be, for example, any business that accepts clients, such as a consulting firm, law firm, accounting firm, or any other business.

The first party $P_1$ can include a single user U or group of users $U_1$, $U_2$ . . . $U_n$. Although a single first party $P_1$ and a single second party $P_2$ are discussed herein for simplicity, it should be understood from this disclosure that the system 10 can operate to support any number of such parties and significantly decreases time spent on client intake and management, particularly as the number of parties involved increases.

The system 10 is configured to access various data sources. As seen in FIG. 1, the system 10 is configured to access an existing second party data source 18 and a third party data source 19. The existing second party data source 18 can include a database controlled by the first party $P_1$ using the system 10, for example, an existing client intake database or directory of current and former clients. In an embodiment, the existing second party data source 18 can be a legacy database which was previously used by the first party $P_1$ or a related party such as a subsidiary, sibling or parent company. The third party data source 19 can include a data source which is controlled by a third party and accessed by the central server 12 via the network 16, for example, a bankruptcy data source, a merger data source, a loan data source, a sanctions data source, a company formation data source, a corporate information data source, a debt or credit data source, and/or another data source. For example, the third party data source 19 can include an internet search platform such as Google, a business information database such as Dunn and Bradstreet or Bureau Van Dijk, a business rating database such as the Better Business Bureau, a credit checking database such as Transunion, a government database such as a Secretary of State database with corporate information, a sanctions data source such as the Office of Foreign Assets Control (OFAC), or another third party data source. In an embodiment, the third party data source 19 is accessible by the system 10 via a public website. The system is also configured to receive data directly from the second party $P_2$ via the network 16.

The user terminals 14 can communicate with the central server 12 via various communication protocols, for example, via an Internet Protocol Suite or TCP/IP supporting HTTP. The network 16 can comprise a public network (e g., the Internet, World Wide Web. etc.), a private network (e.g., local area network (LAN), etc.), and/or combinations thereof (e.g., a virtual private network, LAN connected to the Internet, etc.). The network 16 can include a wired network, a wireless network, and/or a combination of the two.

The central server 12 can comprise one or more server computers, database servers and/or other types of computing devices, particularly in connection with, for example, the implementation of websites and/or enterprise software. The central server 12 can further comprise a central processor 20 and a central memory 22. The central processor 20 is configured to execute instructions programmed into and/or stored by the central memory 22. In an embodiment, the central processor 20 can comprise one or more of a microprocessor, microcontroller, digital signal processor, co-processor or the like or combinations thereof capable of executing stored instructions and operating upon stored data, wherein the instructions and/or data are stored by the central memory 22. The central memory 22 can comprise one or more devices such as volatile or nonvolatile memory, for example, random access memory (RAM) or read only memory (ROM). Further, the central memory 22 can be embodied in a variety of forms, such as a hard drive, optical disc drive, floppy disc drive, etc. As described in more detail below, the steps of the methods described herein can be stored as instructions in the central memory 22 and executed by the central processor 20.

In the illustrated embodiment, the central memory 22 can include a web interface 24, a database 26, and back end processing instructions 28. Here, the web interface 24, the database 26, and the back end processing instructions 28 can be controlled or accessed by the central processor 20 implementing appropriate software programs by executing the back end processing instructions 28 or other instructions programmed into and/or stored by the central memory 22.

The web interface 24 can provide a graphical user interface ("GUI") 25 that can be displayed on a terminal 14 for a user U, and can manage the transfer of data received from and sent to the GUI 25 on the terminal 14. For example, the GUI 25 can be employed by a user U to enter data about the second party $P_2$, to provide such data to the central server 12, and/or to receive or adjust weights and/or risk parameters, as described in more detail below. In an embodiment, each user terminal 14 can include an application A comprising software downloaded to and executed by the terminal 14 to provide the GUI 25 and to manage communications with the central server 12. The application A can be downloaded to the user terminal 14 from the central server 12 or from some other source such as an application distribution platform.

The database 26 can store data relevant to the second party P$_2$, as well as data retrieved from the second party P$_2$, an existing second party data source 18, and/or a third party data source 19. In an embodiment, the database 26 can comprise a database management system (DBMS) operating on one or more suitable database server computers. Alternatively, the database 26 can comprise storage components from other systems, such as an existing client management tool having relevant data concerning the second party P$_2$ already stored therein. The database 26 can store a matter database D as described in more detail below. The matter database can include, for example, names of current and former clients, names of adverse parties to the current or former clients, and names of affiliates of the clients or adverse parties. Examples of other data that can be stored in the database 26 include, but are not limited to: (i) one or more names for second parties P$_2$, (ii) one or more names of companies related to a second party P$_2$, (ii) addresses or other contact information used by a second party P$_2$, (iv) known names of members or employees of a second party P$_2$, (v) previous searches run by the system 10 regarding the second party P$_2$ or an affiliate, and/or (vi) any other information related to a second party P$_2$.

The back end processing instructions 28 can be operatively coupled to both the web interface 24 and the database 26, and can be programmed into and/or stored by the central memory 22 and implemented by the central processor 20. In an embodiment, the back end processing instructions 28 can be executed by the central processor 20 to direct operations of the central server 12 as described below in further detail. For example, the central processor 20, executing the back end processing instructions 28, can manage the receipt, storage, maintenance, etc. of relevant data (e.g., received from one or more user U of the first party P$_1$ via a terminal 14) concerning the second party P$_2$. Additionally, the central processor 20, executing the back end processing instructions 28, can develop similar data relevant to the second party P$_2$ based on information obtained from the second party P$_2$, an existing second party databases 18, and/or a third party data source 19, as well as further functions discussed in more detail below.

Figure 2:
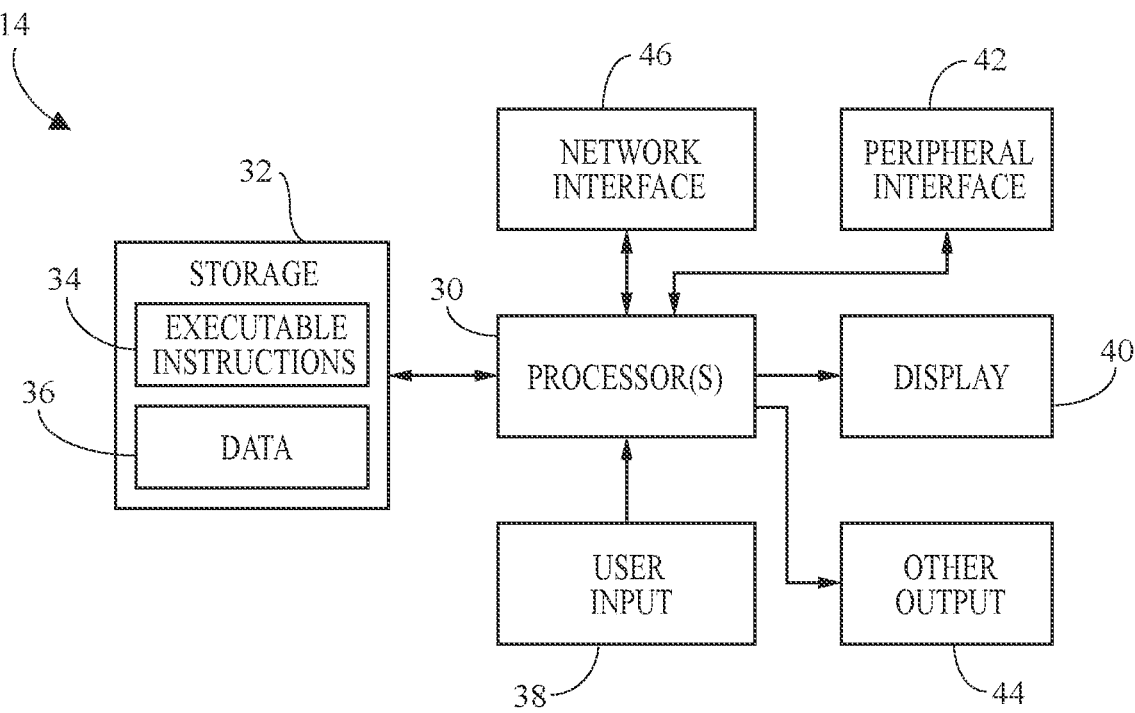
FIG. 2 is a representative diagram of an example embodiment of a user terminal which can be used in the system of FIG. 1.

FIG. 2 illustrates a representative diagram of an example embodiment of a user terminal 14. As illustrated, a user terminal 14 can include a terminal processor 30 and a terminal memory 32. The terminal processor 30 is configured to execute instructions programmed into and/or stored by the terminal memory 32. The instructions can be received from and/or periodically updated by the web interface 24 of the central server 12 in accordance with the methods discussed herein. As described in more detail below, many of the functions described herein can be stored as instructions in the terminal memory 32 and executed by the terminal processor 30.

In an embodiment, the terminal processor 30 can comprise one or more of a microprocessor, microcontroller, digital signal processor, co-processor or the like or combinations thereof capable of executing stored instructions 34 and operating upon stored data 36, wherein the instructions 34 and/or stored data 36 are stored by the terminal memory 32. The terminal memory 32 can comprise one or more devices such as volatile or nonvolatile memory, for example, random access memory (RAM) or read only memory (ROM). Further, the terminal memory 32 can be embodied in a variety of forms, such as a hard drive, optical disc drive, floppy disc drive, etc. In an embodiment, many of the processing techniques described herein are implemented as a combination of executable instructions 34 and data 36 stored within the terminal memory 32.

As illustrated, each of the plurality of user terminals 14 includes one or more user input device 38, a display 40, a peripheral interface 42, one or more other output device 44, and a network interface 46 in communication with the terminal processor 30. The user input device 38 can include any mechanism for providing a user input to the terminal processor 30, for example, a keyboard, a mouse, a touch screen, a microphone and/or suitable voice recognition application, or another input mechanism. The display 40 can include any conventional display mechanism such as a cathode ray tube (CRT), a flat panel display, a touch screen, or another display mechanism. Thus, as can be understood, the user input device 38 and/or the display 40 and/or any other suitable element can be considered a GUI 25. The peripheral interface 42 can include the hardware, firmware, and/or other software necessary for communication with various peripheral devices, such as media drives (e.g., magnetic disk or optical disk drives), other processing devices, or another input source used as described herein. Likewise, the other output device 44 can optionally include similar media drive mechanisms, other processing devices or other output destinations capable of providing information to a user of the user terminal 14, such as speakers, LEDs, tactile outputs, etc. The network interface 46 can comprise hardware, firmware and/or software that allows the terminal processor 30 to communicate with other devices via wired or wireless networks 16, whether local or wide area, private or public. For example, such networks 16 can include the World Wide Web or Internet, or private enterprise networks, or the like.

While the user terminal 14 has been described as one form for implementing the techniques described herein, those having ordinary skill in the art will appreciate from this disclosure that other functionally equivalent techniques can be employed. For example, some or all of the functionality implemented via executable instructions can also be implemented using firmware and/or hardware devices such as application specific integrated circuits (ASICs), programmable logic arrays, state machines, etc. Further, other implementations of the user terminal 14 can include a greater or lesser numbers of components than those illustrated. Further still, although a single user terminal 14 is illustrated in FIG. 2, it should be understood from this disclosure that a combination of such devices can be configured to operate in conjunction (for example, using known networking techniques) to implement the methods described herein. It should also be understood from this disclosure that the contact terminals 15 can include the same elements as the user terminals 14.

Figure 3:
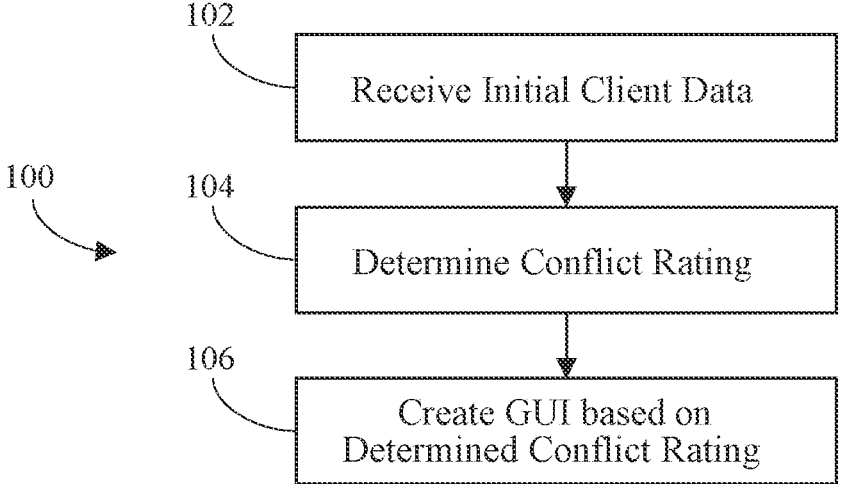
FIG. 3 illustrates an example embodiment of a method for client intake and management that can be practiced using the system of FIG. 1.

The system 10 illustrated in FIGS. 1 and 2 is configured to assist one or more user U and/or first party P$_1$ in determining client risk and managing clients based thereon. FIG. 3 illustrates an example embodiment of a method 100 for client intake and management that can be implemented by the system 10. In an embodiment, one or more of the steps of the method 100 can be stored as instructions on the central memory 22 and executed by the central processor 20. In an embodiment, one or more of the steps of the method 100 can be stored as instructions on the terminal memory 32 and executed by the terminal processor 30. It should be understood by those of ordinary skill in the art from this disclosure that some of the steps described herein can be reordered or omitted without departing from the spirit or scope of method 100.

Figure 7:
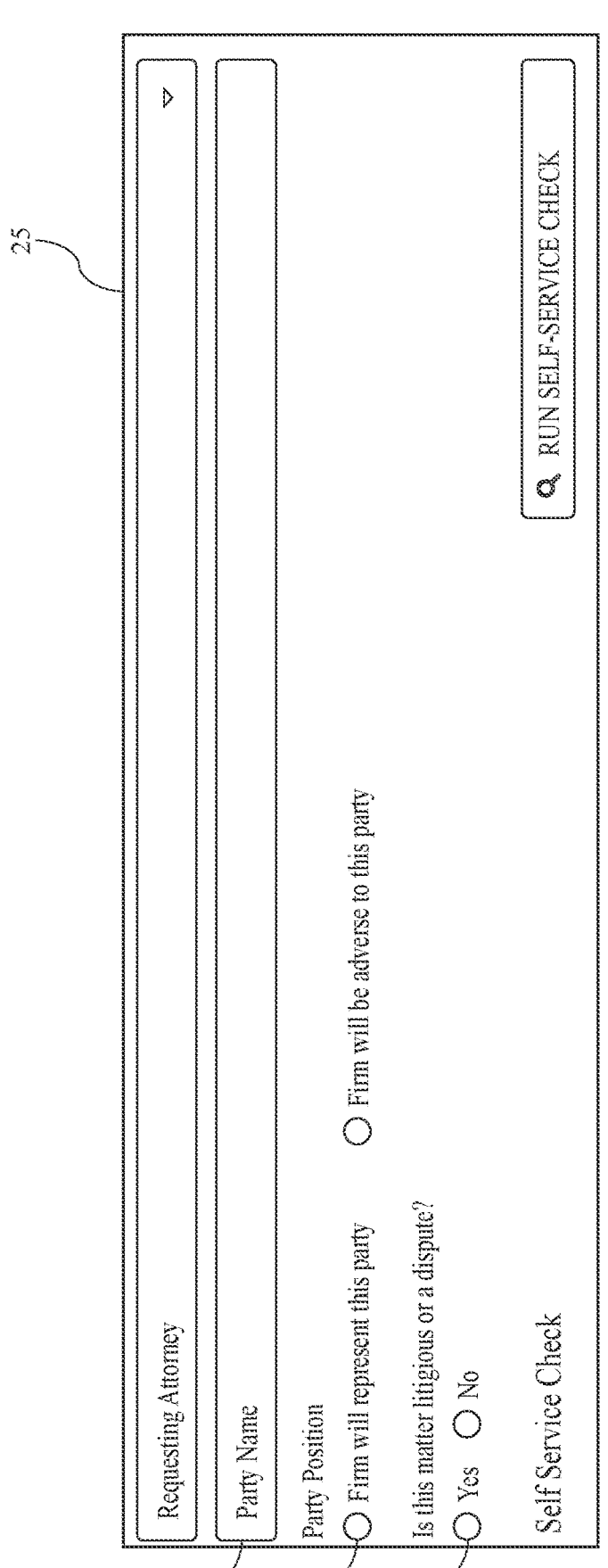
FIG. 7 illustrates an example embodiment of a GUI for a user terminal which can be used in accordance with the present disclosure.

At step 102, the system 10 receives initial client data about a second party $P_2$. The second party $P_2$ can be a party being considered as a new client or a party that will be adverse to a new or current client. The initial client data can be entered by a user U into a user terminal 14 via a user input device 38 and stored on the terminal memory 32 as data 36. In an embodiment, the initial client data includes a name of the second party $P_2$ and at least a selection regarding the second party $P_2$ and/or new matter. More specifically, the initial client data includes (i) a name N of the second party $P_2$, (ii) a selection S1 of whether the second party $P_2$ will be a client or an adverse party, and/or (iii) a selection S2 of whether the matter involved with the second party $P_2$ will be litigious (e.g., a dispute/conflict between two parties). FIG. 7 illustrates an example embodiment of a GUI 25 of a user terminal 14 which enables entry of the name N, the selection S1, and the selection S2. In an embodiment, using only this information, the system 10 is configured perform a quick and reliable conflict check, without additional human intervention. After entry by the user U, the initial client data is transmitted from the user terminal 14 to the central server 12.

In an embodiment, the initial client data can include additional information. For example, the initial client data can include any information known about the second party $P_2$, including for example: (i) the name of the second party $P_2$, (ii) the address of the second party $P_2$, (iii) the known names of any individual members or employees of the second party $P_2$, (iv) alternative names used by the second party $P_2$, (v) names used by related companies such as subsidiaries, sibling or parent companies, or (vi) any other information known by a user U about the second party $P_2$.

At step 104, the central server 12 processes the received initial client data (e.g., data 36). Specifically, the central server 12 processes the received initial client data to determine one of a plurality of conflict ratings. In the illustrated embodiment, the central server 12 uses the received initial client data to determine a first conflict rating C1, a second conflict rating C2, or a third conflict rating C3 for the second party $P_2$. In an embodiment, the first conflict rating C1 is indicative of a direct conflict (e.g., a highest level of conflict), the second conflict rating C2 is indicative of a potential conflict (e.g., an intermediate level of conflict which may require a waiver), and the third conflict rating C3 is indicative of no conflict.

FIG. 4A to 4F illustrates an example embodiment of step 104. In the illustrated embodiment, the initial client data includes (i) a name N of the second party $P_2$, (ii) a selection S1 of whether the second party $P_2$ will be a client or an adverse party, and/or (iii) a selection S2 of whether the matter involved with the second party $P_2$ will be litigious (e.g., dispute/conflict between two parties).

Here, the central server 12 processes the initial client data using hierarchal searching. An example embodiment of the hierarchical searching is illustrated by FIGS. 4A to 4F. By using the hierarchal searching as illustrated, the central server 12 is able to quickly process the initial client data and determine a conflict rating. This hierarchal searching process conserves processing power and requires smaller databases in comparison to alternative methods. This hierarchal searching is also able to obtain quick and accurate results without the need for additional human intervention.

Here, the central server 12 searches the name N in a matter database D. The matter database can be saved as a database 26 in the memory 22. The matter database D includes open matters OM and closed matters CM, with each open matter OM or closed matter CM including a previous or current client PC. Each open matter OM or closed matter CM can also include one or more adverse party AP if one exists. Each open matter OM or closed matter CM can also include one or more affiliate AF if one exists.

The central server 12 first determines whether the name is of a client or an adverse party based on the selection S1 at step 102. The central server 12 then determines whether the matter will be litigious based on the selection S2 at step 102. By using the hierarchal searching shown and determining whether the name is found in the matter database D as a previous or current client PC, adverse party AP, or an affiliate AF, a quick conflict determination can be made on the fly with limited information.

In an embodiment, the hierarchal searching is able to determine a conflict rating using the name of the party and at least one selection in combination with a location of the party name in the matter database D. The at least one selection can include a first selection of whether the second party $P_2$ will be a client or an adverse party. The at least one selection can include a second selection of whether the matter involved with the second party will be litigious. The location of the party name in the matter database D can include a location of the party name in an open matter or a closed matter. The location of the party name in the matter database D can include a location of the party name in a current or previous client listing, a current or previous adversary listing, and/or affiliate listing. The location of the party name in the matter database D can also be a location in a first memory or a second memory.

Figure 4A:
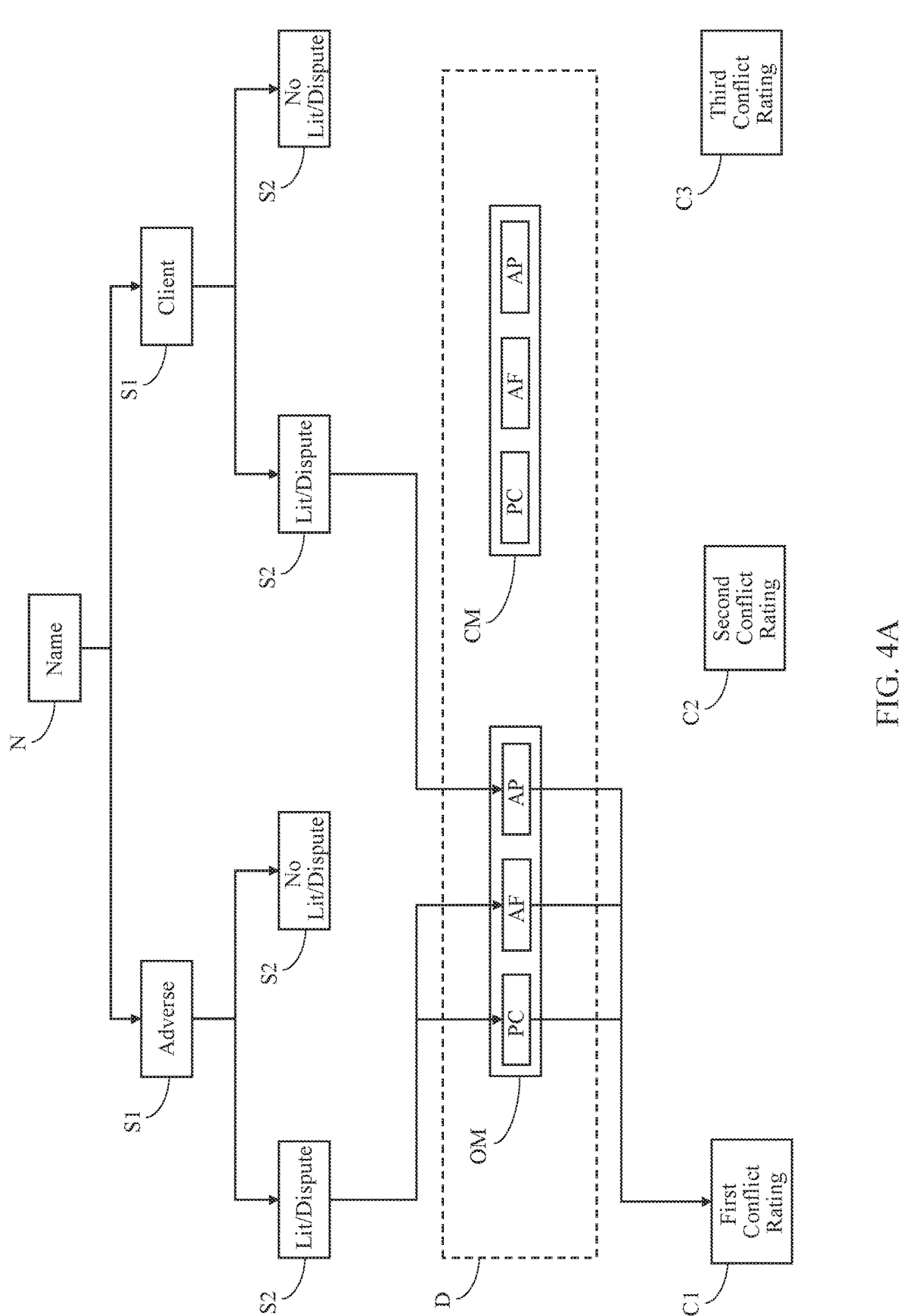
FIGS. 4A to 4F illustrate an example embodiment of a method for client intake and management that can be practiced as part of the method of FIG. 3 and/or using the system of FIG. 1.

In the examples shown, FIG. 4A illustrates hierarchal searching resulting in a determination of a first conflict rating C1 (e.g., a highest level of conflict); FIGS. 4B to 4E illustrate hierarchal searching resulting in a determination of a second conflict rating C2 (e.g., an intermediate level of conflict which may require a waiver); FIG. 4F illustrates hierarchal searching resulting in a determination of a third conflict rating C3 (e.g., no conflict). The flow paths shown in FIGS. 4A to 4F illustrate how hierarchal searching using the selections S1 and S2 and the location of the party name in the matter database I) leads to a respective conflict rating. FIG. 4F also illustrates flow paths where the party name is not found in any location. It should be understood by those of ordinary skill in the art from this disclosure that these are examples only and that alternative embodiments are also possible. In an embodiment, FIGS. 4A-4F illustrate initial settings, and the system 10 is configured to enable an operator to modify the hierarchal searching shown to be tailored to an individual business so that the conflict ratings C1-C3 are triggered under alternative circumstances.

In FIG. 4A, the hierarchal searching determines the first conflict rating C1. When the central server 12 determines the name to be adverse at S1, then determines the matter to be litigious at S2, then determines that the name is found in the matter database D in an open matter OM as a previous or current client PC or affiliate AF, the central server 12 issues the first conflict rating C1. When the central server 12 determines the name to be a client at S1, then determines the matter to be litigious at S2, then determines that the name is found in the matter database D in an open matter OM as an adverse party AP, the central server 12 issues the first conflict rating C1.

Figure 4B:
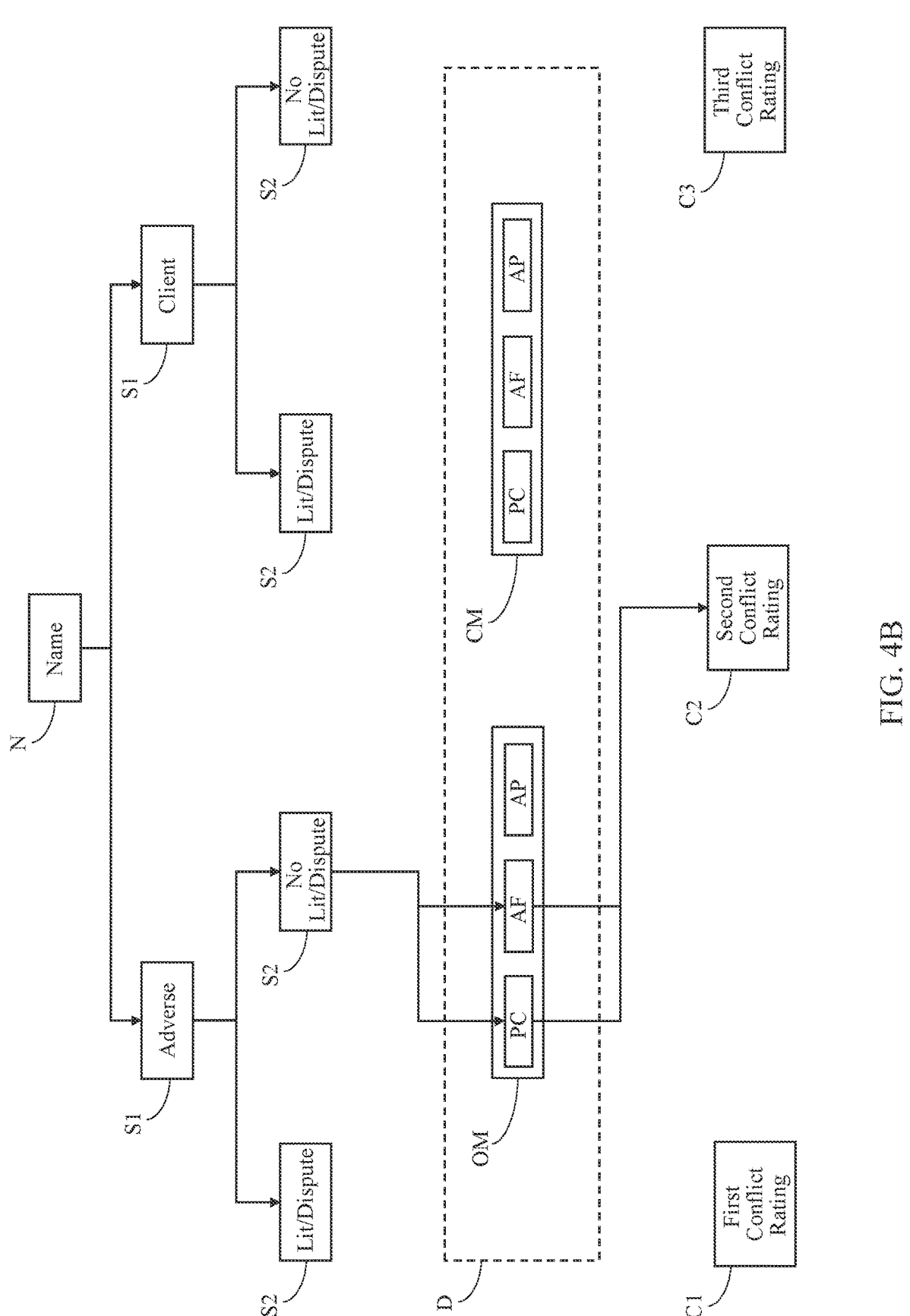

In FIG. 4B, the hierarchal searching determines the second conflict rating C2. When the central server 12 determines the name to be adverse at S1, then determines the matter not to be litigious at S2, then determines that the name is found in the matter database D in an open matter OM as a previous or current client PC or affiliate AF, the central server 12 issues the second conflict rating C2.

Figure 4C:
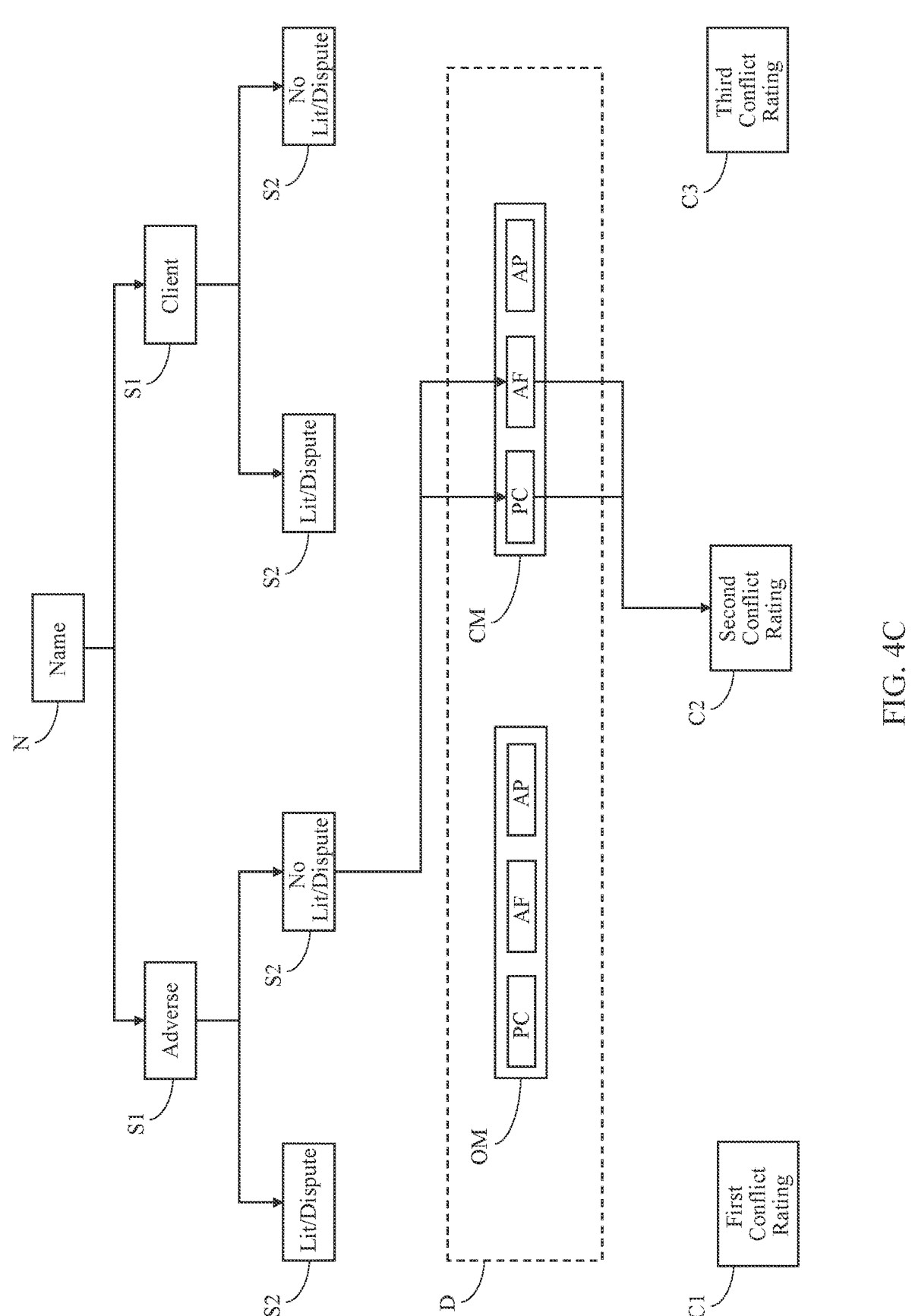

In FIG. 4C, the hierarchal searching determines the second conflict rating C2. When the central server 12 determines the name to be adverse at S1, then determines the matter not to be litigious at S2, then determines that the name is found in the matter database D in a closed matter CM as a previous or current client PC or affiliate AF, the central server 12 issues the second conflict rating C2.

Figure 4D:
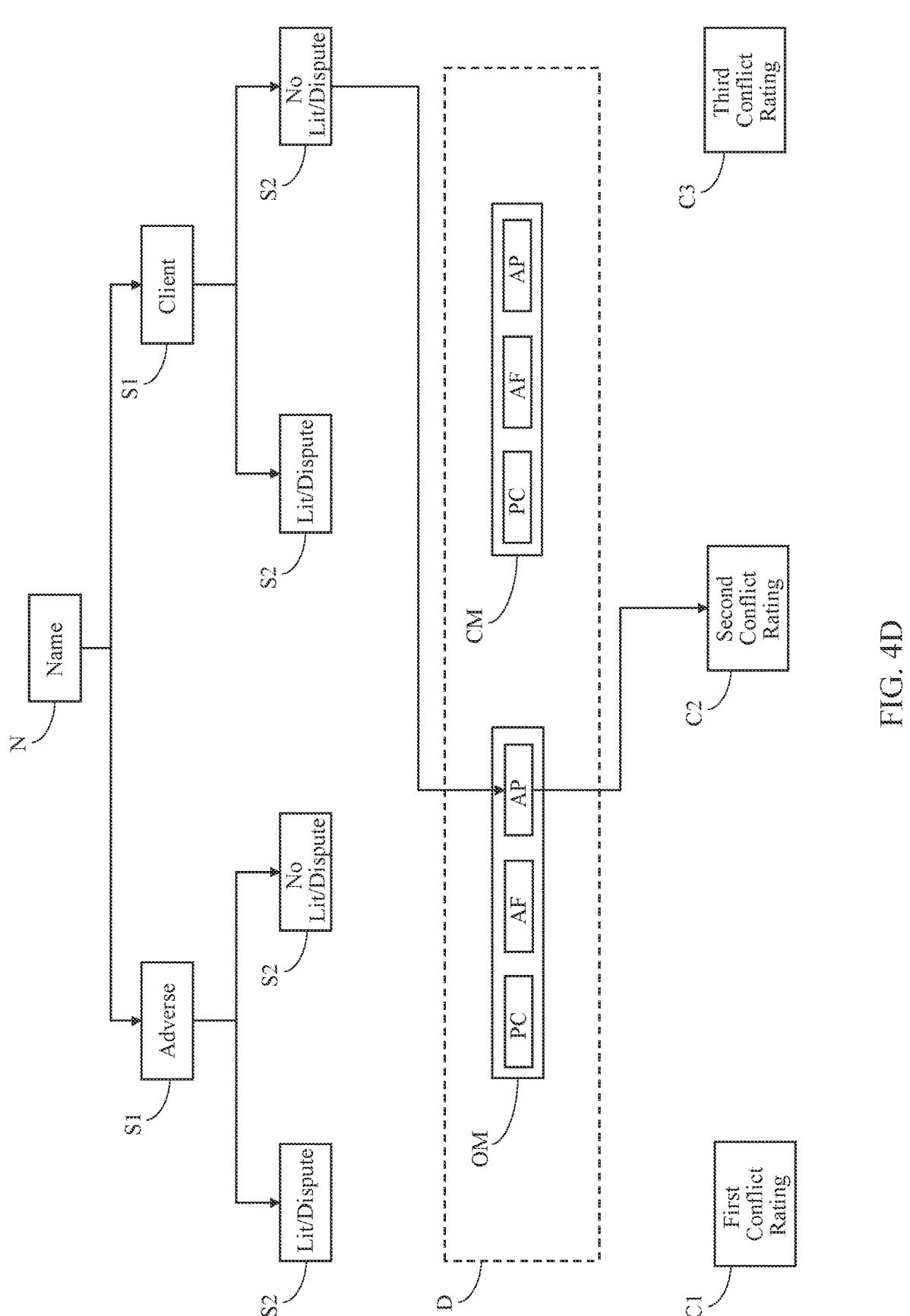

In FIG. 4D, the hierarchal searching determines the second conflict rating C2. When the central server 12 determines the name to a client at S1, then determines the matter not to be litigious at S2, then determines that the name is found in the matter database D in an open matter OM as an adverse party AP, the central server 12 issues the second conflict rating C2.

Figure 4E:
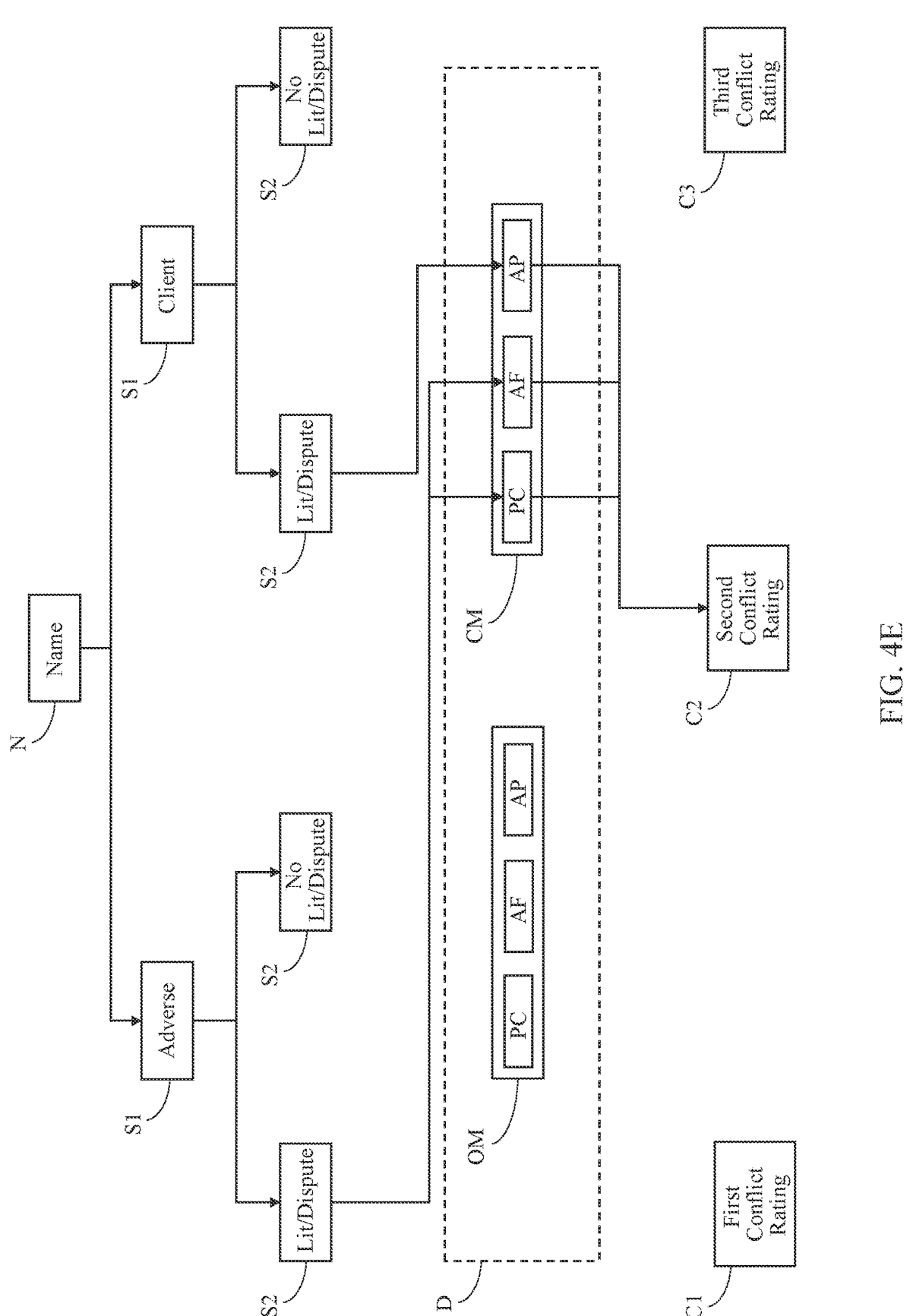
Figure 4F:
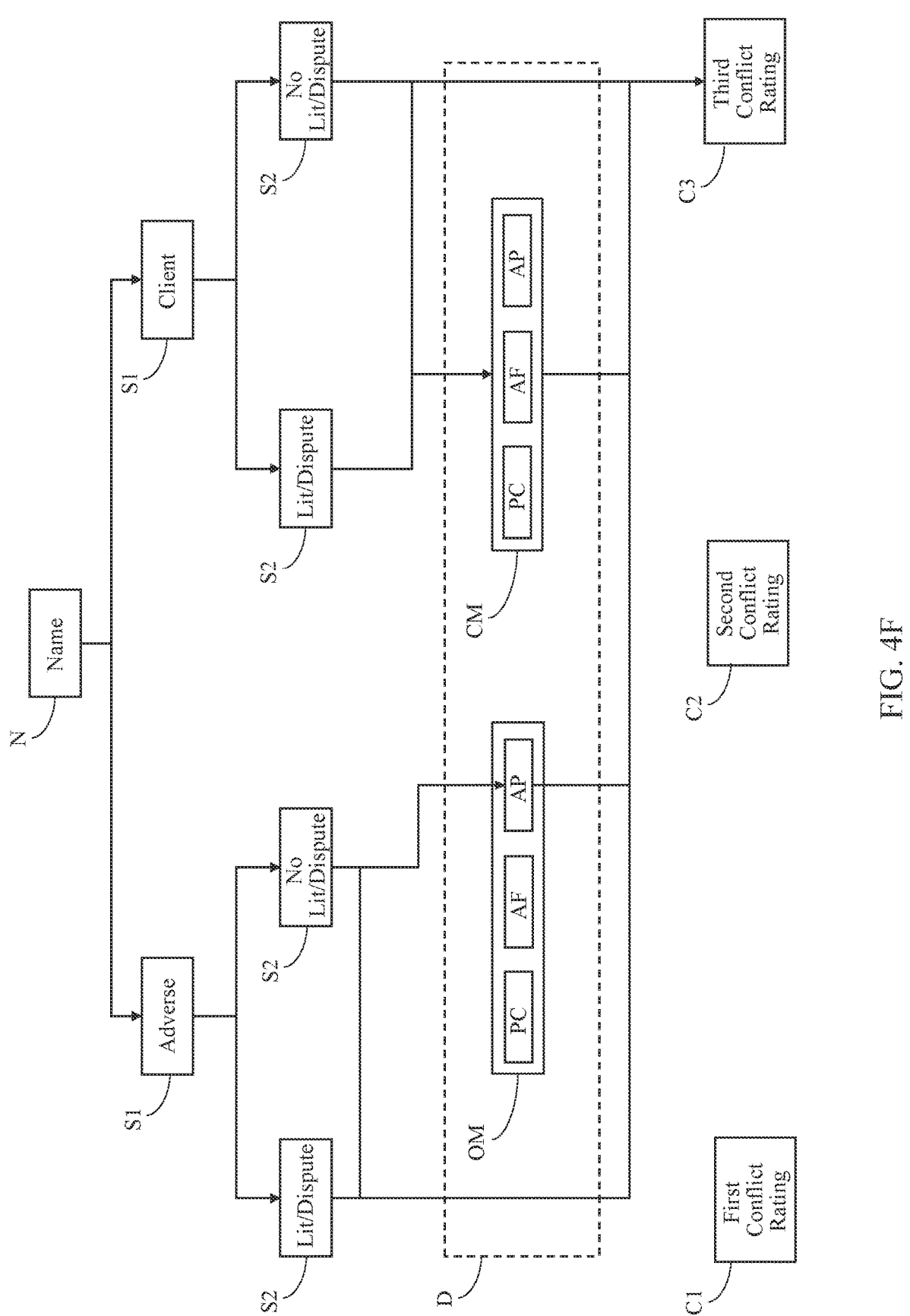

In FIG. 4E, the hierarchal searching determines the second conflict rating C2. When the central server 12 determines the name to be adverse at S1, then determines the matter to be litigious at S2, then determines that the name is found in the matter database D in a closed matter CM as a previous or current client PC or affiliate AF, the central server 12 issues the second conflict rating C2. When the central server 12 determines the name to be a client at S1, then determines the matter be litigious at S2, then determines that the name is found in the matter database D in a closed matter OM as an adverse party AP, the central server 12 issues the second conflict rating C2.

In FIG. 4F, the hierarchal searching determines the third conflict rating C3. When the central server 12 determines the name to be adverse at S1, then determines the matter to be litigious at S2, then does not find the name in the database D, the central server 12 issues the third conflict rating C3. When the central server 12 determines the name to be adverse at step S1, then determines the matter not to be litigious at S2, then does not find the name in the database D, the central server 12 issues the third conflict rating C3. When the central server 12 determines the name to be adverse at S1, then determines the matter to be litigious at S2, then determines that the name is found in the matter database D in an open matter OM as an adverse party AP, the central server 12 issues the third conflict rating C3. When the central server 12 determines the name to be adverse at step S1, then determines the matter not to be litigious at S2, then determines that the name is found in the matter database D in an open matter OM as an adverse party AP, the central server 12 issues the third conflict rating C3. When the central server 12 determines the name to be a client at step S1, then determines the matter to be litigious at S2, then determines that the name is found in the matter database D in a closed matter CM or does not find the name in the matter database D, the central server 12 issues the third conflict rating C3. When the central server 12 determines the name to be a client at step S1, then determines the matter not to be litigious at S2, then determines that the name is found in the matter database D in a closed matter CM or does not find the name in the matter database D, the central server 12 issues the third conflict rating C3.

At step 106, the central server 12 causes the GUI to be updated based on the determination of the conflict rating for the second party P₂. For example, a red indicator can be highlighted on the GUI when the central server 12 determines that the name of the second party P₂ warrants a first conflict rating C1; a yellow indicator can be highlighted on the GUI when the central server 12 determines that the name of the second party P₂ warrants a second conflict rating C2; a red indicator can be highlighted on the GUI when the central server 12 determines that the name of the second party P₂ warrants a third conflict rating C3. The central server 12 can further cause one or more icons to be arranged on the screen to highlight the open matters OM or closed matters CM which led to the rating. If there are multiple matters which includes the name as identified by the hierarchal searching, the central server 12 can arrange the icons to highlight (e.g., by color or order) the matters identified by a first conflict rating C1 versus a second conflict rating C2 or a third conflict rating C3, or can arrange the icons to highlight (e.g., by color or order) the matters identified by a second conflict rating C2 versus a third conflict rating C3.

In an embodiment, each hierarchical search is saved in the database. When a new search is run, the new search uses the saved searches as potential search results. In this way, the system 10 conserves processing power by avoiding the need to rerun searches multiple times.

Figure 5:
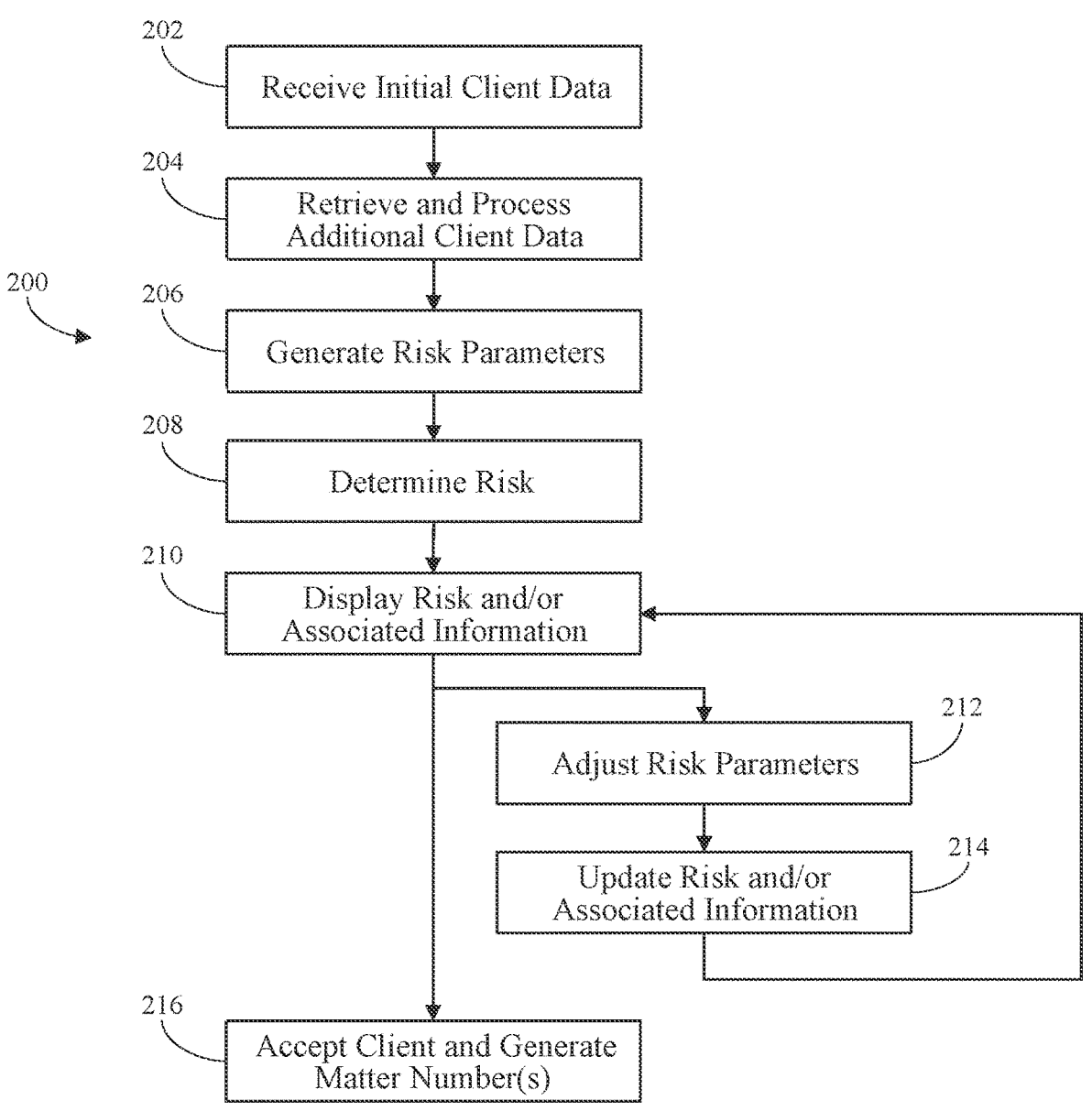
FIG. 5 illustrates another example embodiment of a method for client intake and management that can be practiced using the system of FIG. 1.

FIG. 5 illustrates an example embodiment of a method 200 for client intake and management that can be implemented by the system 10. In an embodiment, one or more of the steps of the method 200 can be stored as instructions on the central memory 22 and executed by the central processor 20. In an embodiment, one or more of the steps of the method 200 can be stored as instructions on the terminal memory 32 and executed by the terminal processor 30. It should be understood by those of ordinary skill in the art from this disclosure that some of the steps described herein can be reordered or omitted without departing from the spirit or scope of method 200.

In an embodiment, the method 200 can be automatically initiated based on the results of the method 100, and can use the same initial client data from the method 100. In an embodiment, the method 200 can be initiated based on the determined conflict rating during step 100. For example, the method 200 can be initiated when the central server determines that a second party P₂ warrants a second conflict rating C2; or the method 200 can be initiated when the central server determines that a second party P₂ warrants a third conflict rating C3.

At step 202, the system 10 receives initial client data about a second party P₂ being considered as a new client. The second party P₂ can be a party being considered as a new client or a party that will be adverse to a new or current client. The initial client data can be entered by a user U into a user terminal 14 via a user input device 38 and stored on the terminal memory 32 as data 36. In an embodiment, the initial client data can initially include a name of the second party P₂. In an embodiment, using only this information, the system 10 can perform a quick and reliable risk assessment. After entry by the user U, the initial client data is transmitted from the user terminal 14 to the central server 12.

In an embodiment, the initial client data can include additional information. For example, the initial client data can include any information known about the second party P₂, including for example: (i) the name of the second party P₂, (ii) the address of the second party P₂, (iii) the known names of any individual members or employees of the second party P₂, (iv) alternative names used by the second party P₂, (v) names used by related companies such as subsidiaries, sibling or parent companies, or (vi) any other information known by a user U about the second party P₂.

At step 204, the central server 12 uses the received initial client data (e.g., data 36) to retrieve and process additional client data. The central server 12 is configured to retrieve the additional information, for example, from an existing second party data source 18 and/or a third party data source 19. In an embodiment, the central server accesses previous risk assessments which have been performed and saved in the memory 22. The central server 12 can also receive additional client data directly from the second party P$_2$ via the network 16. For example, the central server 12 can automatically initiate a communication with the second party P$_2$ so that the second party P$_2$ provides any additional information that was not known to the user U during step 102. The central server 12 is configured to retrieve the additional client data using key words which correspond to the initial client data. In an embodiment, the central server is further configured to retrieve the additional client data based on key words discovered when processing other additional client data.

In an embodiment, second party P$_2$ can provide initial client data. That is, at step 202, the central server 12 can communicate directly with the second party P$_2$ to receive initial client data. The central server 12 can then use the initial client data received from the second party P$_2$ to retrieve additional client data from the memory 22, an existing second party data source 18 and/or a third party data source 19.

In an embodiment, the central server 12 is configured to retrieve additional client data from an existing second party data source 18. In an embodiment, the central server 12 is also configured to assign a reliability weight RW to the information from the existing second party data source 18. Since the second party data source is controlled by or regularly accessed by the central server 12 when processing potential new clients, the information in the existing second party data source 18 can be in a format understood by the central server 12 and thus be assigned a high reliability weight RW that the information is accurate.

In an embodiment, the central server 12 is configured to retrieve additional client data from a third party data source 19. The third party data source 19 can be, for example, a public website operated by a third party. For example, the third party data source 19 can include one or more business source such as Dunn and Bradstreet or Bureau van Dijk which includes corporate trees showing affiliate companies of the second party P$_2$. In another example, the third party data source 19 can include one or more a sanctions data source such as the Office of Foreign Assets Control (OFAC). In an embodiment, the central server 12 is programmed to access one or more specific website links corresponding to a third party data source 19 to retrieve the additional data. In an embodiment, the third party data source 19 can include information, for example, related to debts and sanctions acquired by the second party P$_2$. In an embodiment, the central server 12 is also configured to assign a reliability weight RW to any information retrieved from the third party data source 19. The reliability weights RW can be based on whether the information retrieved is in a format understood by the central server 12. In an embodiment, the reliability weight RW can be an indication of reliable or not reliable. In an embodiment, the reliability weight RW can be a numerical number. In an embodiment, the reliability weight RW can be based on where information is found on a document or website. In an embodiment, the reliability weight RW can be based on the specific third party source 19 depending on whether the third party source 19 is known to be reliable. In an embodiment, a reliability weight RW generated for additional client data retrieved from a third party data source 19 is lower than a reliability weight RW generated for additional client data retrieved from an existing second party data source 18. That is, if the existing second party data source 18 is controlled by the first party P$_1$, then the system 10 can have more confidence that the information acquired therefrom is accurate and reliable.

Alternatively, a reliability weight RW generated for additional client data retrieved from a third party data source 19 can be higher than a reliability weight RW generated for additional client data retrieved from an existing second party data source 18 considering that the third party data source may be more up-to-date.

In an embodiment, the central server 12 is configured store an extraction algorithm which uses previous data from known documents or websites. The known documents or websites can previously retrieved or accessed by the central server 12 when processing another second party P$_2$. The known documents can previously retrieved from the other second party P$_2$, an existing second party data source 18, and/or a third party data source 19. A known website can be a third party data source 19 which is frequently accessed for information. The system 10 is configured to use the extraction algorithm to extract target data from the additional client data. More specifically, the extraction algorithm is able to locate, extract and classify target data from the additional client data. The target data can include, for example, a name, date, address, number, financial amount, sanction and/or other target data located on a document or website retrieved as additional client data.

In an embodiment, the extraction algorithm can classify a type of document, website or other information retrieved as additional client data from the second party P$_2$, an existing second party data source 18, and a third party data source 19. For example, a document can be classified as a bankruptcy document, a merger document, a loan document, a sanction document, a company formation document, a secretary of state document, a debt or credit document, or another document. Similarly, data from a website can be classified as bankruptcy data, merger data, loan data, sanctions data, company formation data, secretary of state data, debt or credit data, or other data or subcategories. Once the extraction algorithm has classified a document or data, the extraction algorithm is programmed to locate target data based on the classification. For example, the extraction algorithm can locate and extract target data based on the location (e.g., x and y coordinates) on the document or website. In another example, extraction algorithm can locate and extract target data based on proximity and/or location in comparison to a word, group of words (e.g., determined by optical character recognition), or a classification code. The extraction algorithm can be developed, for example, using a neural network inputted with similar documents and target information. Thus, the extraction algorithm can be trained as to where on a particular type of document or website the target data needed by the system 10 can be found.

After an extraction algorithm is created, new documents or websites can be used to further train the extraction algorithm. For example, a user can review the extracted target data which the extraction algorithm has pulled from new documents or websites, and can determine whether the extraction algorithm has accurately extracted the target data. If the extracted target data is accurate, then this target data can be used to further train the extraction algorithm as a positive example. If the extracted target data is not accurate, then this target data can be used to further train the extraction algorithm as a negative example. Thus, the central server 12 can continuously train the extraction algorithm throughout its use. In this way, the extraction algorithm's accuracy and performance increase the more that system 10 is used in accordance with the methods discussed herein.

The system 10 can assign or adjust a reliability weights RW based on one or more of the source of the data (e.g., whether the source is known to be reliable and/or consistently used), the format of the data (e.g., whether the document is a recognized type), by cross-referencing the information in the retrieved data, by locating inconsistencies in the retrieved data, and/or for other reasons. In an embodiment, a reliability weight is an indication of YES or NO. In another embodiment, a reliability weight RW can be a number between zero and one.

In an embodiment, the central server 12 is configured to cross-reference the additional client data with other additional client data. The central server 12 is further configured to find similarities in various additional client data. The central server 12 is configured to increase a reliability weight based on the cross-referencing. For example, the central server 12 can assign a high reliability weight RW when documents or websites contain more items in common, whereas the central server 12 can assign a low reliability weight RW when documents or websites contain less items in common. Thus, for example, a document or website that has the correct company name, address and employee can be assigned a higher reliability weight than a document or website with only the company name. The data used for cross-referencing can include the initial client data and/or the additional client data. Thus, the central server 12 can find items in common in various documents retrieved from an existing second party data source 18 and/or a third party data source 19 and increase corresponding reliability weights RW based thereon.

In an embodiment, the central server 12 saves the results each time method 200 is performed. When method 200 is performed again, the saved results can be accessed to retrieve additional client data at step 204. In this way, the system 10 conserves processing power by avoiding the need to rerun and/or reclassify data.

In an embodiment, the central server 12 is configured to identify inconsistencies in the retrieved data. The central server 12 is configured to then assign or adjust a reliability weights RW based on the inconsistencies. For example, if the central server obtains inconsistent information from multiple sources, the central server 12 is configured to assign or adjust a reliability weights RW based on the inconsistencies. More specifically, the central server 12 is configured to lower a reliability weight RW based on inconsistent information. Thus, for example, the central server 12 is configured to assign a lower reliability weight RW to a document with the correct company name but an unknown address.

In an embodiment, certain third party sources 19 will result in a higher reliability weights RW than other third party sources 19. The central server 12 is configured to adjust the reliability weight RW based on whether a third party source 19 has been previously judged to be reliable.

Figure 8:
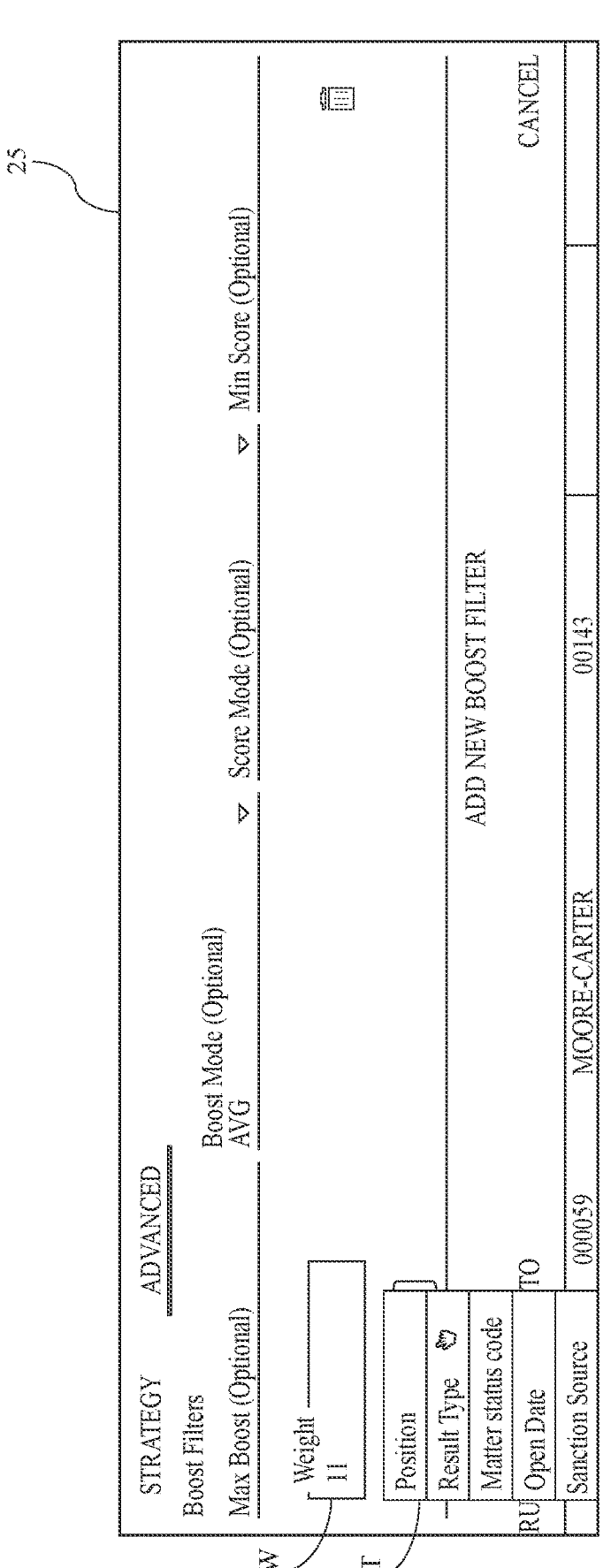
FIG. 8 illustrates an example embodiment of a GUI for a user terminal which can be used in accordance with the present disclosure.

At step 206, the central server generates one or more risk parameters for the second party $P_2$. In an embodiment, one or more risk parameter RP can be generated based on sanctions data retrieved at step 204. In an embodiment, the risk parameter RP can be an indication of YES or NO (e.g., risk or no risk). In an embodiment, the risk parameter RP can include a numerical value. In an embodiment, the risk parameter RP includes or is based on a category weight CW. In an embodiment, the category weight CW is a numerical value that can be adjusted by a user. In an embodiment, the category weight CW is a weight applied based on a category associated with the data retrieved at step 204 (e.g., with the sanctions data). In an embodiment, category weight CW varies for a plurality of categories. The plurality of categories can include, for example, a position of the sanctions data retrieved at step 204 (e.g., position on the third party data source 19 or within a document), a result type of the sanctions data retrieved at step 204 (e.g., the type of sanction), a matter status code of the sanctions data retrieved at step 204 (e.g., matter status code applied by the third party data source 19), an open date of the sanctions data retrieved at step 204 (e.g., a date the sanction was invoked or published by the third party data source), or a sanctions source of the sanctions data retrieved at step 204 (e.g., the third party data source 19). FIG. 8 illustrates an example embodiment of a GUI 25 for a user terminal 14 which enables setting of a category weight for one or more of a plurality of categories CT. FIG. 8 further allows a boost filter to be utilized in combination with the category weight CW. In an embodiment, the boost filter can be set to increase or decrease a risk parameter or corresponding score in various circumstances and/or to filter certain risk parameter or corresponding scores outside of a predetermined value. In an embodiment, the category weight CW can include or be based on the reliability weight RW.

In an embodiment, the central server 12 is configured to determine one or more risk parameter RP as a numerical value associated with the second party $P_2$. In an embodiment, the central server 12 calculates the risk parameters RP based on the additional client data retrieved from one or more of the memory 22, the second party $P_2$, the existing second party data source 18, and/or the third party data source 19. In an embodiment, the central server 12 generates a risk parameter RP for each of a plurality of documents or websites retrieved from an existing second party data source 18 and/or the third party data source 19. In an embodiment, the central server 12 generates a risk parameter RP for each of a plurality of items of target data retrieved from an existing second party data source 18 and/or the third party data source 19. In an embodiment, each risk parameter RP corresponds to a category weight CW and/or reliability weight RW associated with a document or item of target data.

At step 208, the central server 12 determines the risk associated with accepting the second party $P_2$ as a client. In an embodiment, the central server 12 determines the risk based on the risk parameter RP. For example, if the risk parameter RP is an indication of risk or no risk, the central server 12 can determine risk based on a YES or NO determination. Alternatively, if the risk parameter RP includes one or more numerical value, the central server 12 can determine risk based on whether one or more predetermined numerical thresholds have been met.

In an embodiment, the central server 12 is configured to use the one or more risk parameters RP to calculate a total risk TR. In an example embodiment, the central server 12 is configured to calculate the total risk TR as follows:

$$TR = \frac{(RP1 \times W1) + (RP2 \times W2) + \dots (RPn \times Wn)}{n} \quad \text{(Equation 1)}$$

In equation 1, RP1 is a risk parameter corresponding to a first document or item of target data, and W1 is the reliability or category weight corresponding to the first document, website or item of target data. RP2 is a risk parameter for a second document or item of target data, and W2 is the reliability or category weight corresponding to the second document, website or item of target data. RPn is a risk parameter for an nth document or item of target data, and Wn is the reliability or category weight corresponding to the nth document, website or item of target data.

The document, website or item of target data can relate to, for example, previous bankruptcies by the second party $P_2$ or a related party, pending litigations by the second party $P_2$ or a related party, debts owed by the second party $P_2$ or a related party, previous delinquent payments by the second party $P_2$ or a related party, previous sanctions by the second party $P_2$ or a related party, and/or other categories which tend to indicate a risk of nonpayment. The related party can be determined by a corporate relationship or by having common members or employees. In an embodiment, the central server 12 can generate the risk parameters RP based on predetermined parameters. For example, a risk parameter RP associated with bankruptcy can be a YES or NO based on whether or not the second party $P_2$ has not previously filed for bankruptcy; a risk parameter RP associated with bankruptcy can be a maximum number if the second party $P_2$ has previously filed for bankruptcy and a minimum number if the second party $P_2$ has not previously flied for bankruptcy; a risk parameter RP associated with bankruptcy can also vary based on bankruptcies filed by parties associated with the second party $P_2$ or with members or employees of the second party $P_2$; a risk parameter RP associated with pending or previous litigations can be a YES or NO based on whether or not the second party $P_2$ has been involved in a pending or previous litigation; a risk parameter RP associated with pending or previous litigations can vary based on the number and/or judgement size of pending or previous litigations; a risk parameter RP associated with debts owed can vary based on the size or number of debts owed; a risk parameter RP associated with pending or previous litigations can be a YES or NO based on whether or not the second party $P_2$ has been previously sanctioned; a risk parameter RP associated with previous sanctions can also vary based on the size, number and/or type of sanctions.

In an embodiment, the central server 12 is configured to approve or reject a second party $P_2$ as a client based on the risk parameter RP. In an embodiment, the central server 12 is configured to approve or reject a second party $P_2$ as a client based on the calculated total risk TR. The central server 12 is configured to store a risk parameter RP or total risk threshold, which can be a fixed or variable value. For example, the central server 12 is configured to approve or reject a second party $P_2$ based on the risk parameter RP or calculated total risk being outside of the risk parameter RP or total risk threshold. For example, the risk parameter RP or total risk threshold can specify an upper approval value, where the central server 12 rejects the second party as a client if the risk parameter RP or total risk TR is above the upper approval value. Additionally or alternatively, the risk parameter RP or total risk threshold can specify a lower approval value, where the central server 12 rejects the second party $P_2$ as a client if the risk parameter RP or total risk TR is below the lower approval value.

At step 210, the central server 12 communicates with one or more user terminal 14 to cause information about the second party $P_2$ to be displayed on the display 40 of the user terminal. The user terminal 14 is configured to display whether the second party $P_2$ was approved or rejected as a client. The user terminal 14 is also configured to display the total risk TR, one or more risk parameter RP, one or more category weight CW, and/or one or more reliability weight RW. In an embodiment, the user terminal 14 is configured to arrange the information displayed to highlight the parameter RP which is outside of a predetermined threshold or causes the total risk TR to be outside of a predetermined risk threshold. In an embodiment, the user terminal 14 is configured to provide the documents or items of target data that contributed the most to the risk parameter RP or total risk TR being outside of the threshold.

In an embodiment, if the second party P2 has been approved as a client by the central server 12, the method 200 proceeds to step 216. In an embodiment, even if the second party P2 has been rejected as a client by the central server 12, the user U of the user terminal 14 can override the rejection and the method 200 proceeds to step 216. At step 216, once the second party P2 has been approved as a client, the system 10 is configured to generate unique matter numbers for the client.

At step 212, a user U can use a user terminal 14 to review the additional client data retrieved at step 204 which resulted in a risk parameter RP which is outside of a predetermined threshold or causes the total risk TR to be outside of a predetermined risk threshold. The user U can then cause adjustment of the risk parameter RP. In an embodiment, the user U can adjust a category weight CW or a reliability weight RW. For example, the user U can review the additional client data and determine it to be irrelevant, and thus instruct the user terminal to disregard the risk parameter RP and/or the reliability weights RW associated with that additional client data. The user U can also raise or lower the category weights CW or reliability weights RW associated with the additional client data after reviewing the corresponding document or item of target data. The user U can also adjust parameters used to determine the risk parameter RP after reviewing the corresponding document or item of target data, for example, if the user U disagrees that the document or item of target data indicates any ongoing risk associated with the second party $P_2$.

At step 214, the central server 12 receives one or more input from the user U via the user terminal 14. The input can be to adjust or disregard a risk parameter RP or other weight. The central server 12 then adjusts or disregards a risk parameter RP or other weight based on the input and recalculates the risk parameter or total risk TR, for example, as discussed above. In an embodiment, the central server keeps an audit trail of changes made so that the changes that can be reviewed and adjusted at a later time if necessary.

In an embodiment, the central server 12 updates the extraction algorithm and/or the calculation of a future risk parameter RP based on the user input. For example, based on the assessed risk determined by the user U. the system 10 is configured to adjust how risk parameters RP are applied to similar documents or websites in the future. Likewise, based on how reliable information is as determined by the user U, the system 10 is configured to adjust how reliability weights RW or category weights CW are applied to similar documents or to client data from the same source in the future. Further, the user U can examine documents or websites retrieved as additional data and determine whether target data was correctly extracted. Based on user input regarding the extraction of target data, the extraction algorithm can be trained using the document, website and/or target data as a positive or negative example. The extraction algorithm and/or the calculation of a future risk parameter RP can be updated, for example, using a neural network. In this way, the extraction algorithm's accuracy and performance, as well as the accuracy of the risk parameters RP, improve the more that the system 10 is used in accordance with the methods discussed herein.

In an embodiment, at step 214, the central server 12 is configured to approve or reject a second party $P_2$ as a client based on a recalculated risk parameter RP or total risk TR. As discussed above, the central server 12 is configured to approve or reject the second party $P_2$ based on the recalculated risk parameter RP or total risk being outside of the risk threshold. For example, the risk threshold can specify an upper approval value, where the central server 12 rejects the second party $P_2$ as a client if the recalculated risk parameter RP or total risk TR is above the upper approval value. Additionally or alternatively, the risk threshold can specify a lower approval value, where the central server 12 rejects the second party $P_2$ as a client if the recalculated risk parameter RP or total risk TR is below the lower approval value.

In an embodiment, the risk threshold is a predetermined fixed value. Alternatively, the risk threshold is a variable value. The risk threshold can vary, for example, based on the capacity of the first party $P_1$ for additional clients. The risk threshold can vary, for example, based on the calculated risk parameter RP or total risk TR for other or potential clients of the first party $P_1$. Thus, in an embodiment, the risk threshold can be calculated based on total calculated risk for all clients (e.g., if the average calculated TR for all clients is 5.5, the total risk threshold can be set at 5.0 or 5.5).

Once the first party $P_2$ is approved as a client, the method 200 can proceed to step 216 so that the system 10 generates unique matter numbers for the new client.

Figure 6:
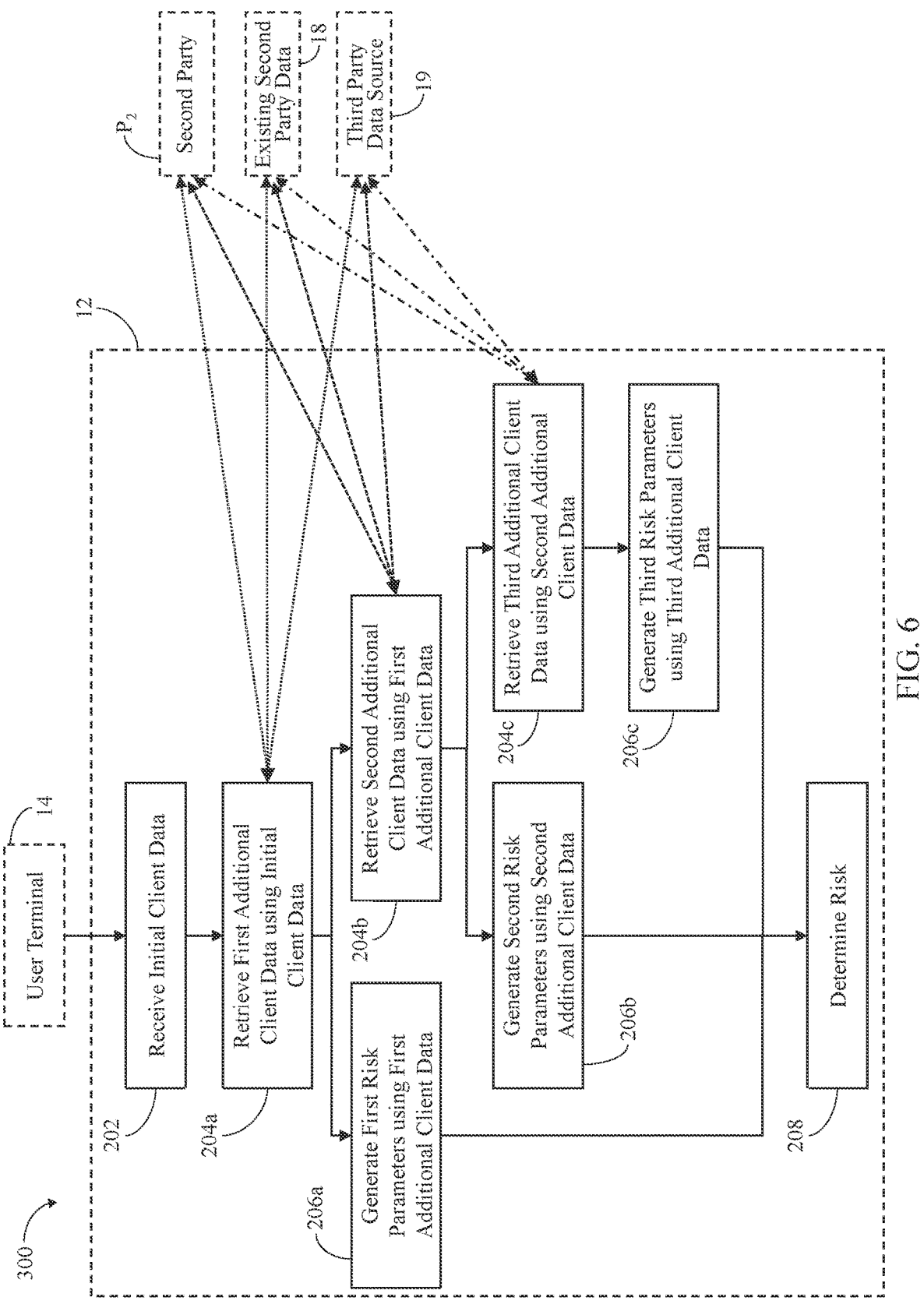
FIG. 6 illustrates another example embodiment of a method for client intake and management that can be practiced using the system of FIG. 1.

FIG. 6 illustrates an example embodiment of a method 300 which can be implemented by the system 10 as part of the method 200. In an embodiment, one or more of the steps of the method 300 can be stored as instructions on the central memory 22 and executed by the central processor 20. In an embodiment, one or more of the steps of the method 300 can be stored as instructions on the terminal memory 32 and executed by the terminal processor 30. It should be understood by those of ordinary skill in the art from this disclosure that some of the steps described herein can be reordered or omitted without departing from the spirit or scope of the method 300.

At step 202, the central server 12 receives initial client data about a second party $P_2$ being considered as a new client, as discussed herein. The initial client data is then transmitted from the user terminal 14 to the central server 12.

At step 204$a$, the central server 12 uses the received initial client data to retrieve and process first additional client data. Specifically, the central server 12 uses the received initial client data to retrieve first additional client data from the memory 22, the second party $P_2$, the second party data source 18, and/or a third party data source 19. The central server 12 is configured to retrieve the first additional client data using first key words from the initial client data. The first additional client data can include additional company names, names of related companies, names of members or employees, new addresses, etc. that were not entered by the user U as initial client data at step 202. The additional company names, names of related companies, names of members or employees, new addresses, etc. can be used to retrieve second additional client data.

In an embodiment, the central server 12 is configured to cross-reference the first additional client data with the initial client data or other additional client data. The central server 12 is configured to find similarities between multiple documents or sources. In an embodiment, the central server 12 is configured to increase a first reliability weight RWa based on the cross-referencing. For example, the central server 12 can assign a high first reliability weight RWa when documents or websites contain multiple items entered as initial client data or found in other additional client data, whereas the central server 12 can assign a low first reliability weight RWa when documents or websites contain less items entered as initial client data or found in other additional client data. Thus, for example, a document or website that has the correct company name, address and employee can be assigned a higher first reliability weight RWa than a document or website with only the company name. The data used for cross-referencing can include the initial client data and/or other additional client data. Thus, the central server 12 can find items in common in various documents or websites retrieved from an existing second party data source 18 and/or a third party data source 19 and increase corresponding first reliability weights RWa based thereon.

At step 206$a$, the central server 12 is configured to generate one or more first risk parameter RPa based on the first additional client data. As discussed above, the central server 12 generates the first risk parameters RPa based on the target data extracted from the first additional client data retrieved from one or more of the memory 22, the second party $P_2$, the existing second party data source 18, and/or the third party data source 19. In an embodiment, each first risk parameter RPa can correspond to a first reliability weight RWa and/or a first category weight CWa.

At step 204$b$, the central server 12 uses the first additional client data to retrieve and process second additional client data. Specifically, the central server 12 uses the retrieved first additional client data to retrieve second additional client data from the memory 22, the second party $P_2$, the second party data source 18, and/or a third party data source 19. The central server 12 is configured to retrieve the second additional client data using second key words from the first additional client data. The second key words can be different from the first key words used to retrieve the first additional client data. In an embodiment, the central server 12 can use the first key words and the second key words to retrieve the second additional client data. The second additional client data can include additional company names, names of related companies, names of members or employees, new addresses, etc. which were extracted from the first additional client data during step 104$a$.

In an embodiment, the central server 12 is configured to assign or adjust second. reliability weights RWb to documents, websites or target data retrieved as part of or extracted from the second additional client data. In an embodiment, the second reliability weights RWb can be numbers between zero and one. The second reliability weights RWb can be lower than the first reliability weights RWa, for example, since they are based on information extracted from the first additional client data as opposed to initial client data entered by the user U. The second additional client data can include additional company names, names of related companies, names of members or employees, new addresses, etc. that were not entered by the user U as initial client data at step 202 or retrieved with the first additional client data at step 204$a$. The additional company names, names of related companies, names of members or employees, new addresses, etc. can be used to retrieve third additional client data.

In an embodiment, the central server 12 is configured to cross-reference the second additional client data with the initial client data, the first additional client data, and/or other second additional client data. The central server 12 is configured to find similarities between multiple documents or sources. In an embodiment, the central server 12 is configured to increase a second reliability weight RWb based on the cross-referencing. For example, the central server 12 can assign a high second reliability weight RWb when documents or websites contain multiple items entered as initial client data or found in other first or second additional client data, whereas the central server 12 can assign a low second reliability weight RWb when documents or websites contain less items entered as initial client data or found in other first or second additional client data. Thus, for example, a document or website that has the correct company name, address and employee can be assigned a higher second reliability weight RWb than a document or website with only the company name. The data used for cross-referencing can include the initial client data and/or other first or second additional client data. Thus, the central server 12 can find items in common in various documents or websites retrieved from an existing second party data source 18 and/or a third party data source 19 and increase corresponding second reliability weights RWb based thereon.

At step 206b, the central server 12 is configured to generate one or more second risk parameter RPb based on the second additional client data. As discussed above, the central server 12 generates the second risk parameters RPb based on the target data extracted from the second additional client data retrieved from one or more of the memory 22, the second party $P_2$, the existing second party data source 18, and/or the third party data source 19. In an embodiment, each second risk parameter RPb can correspond to a second reliability weight RWb and/or a second category weight CWb.

At step 204c, the central server 12 uses the second additional client data to retrieve and process third additional client data. Specifically, the central server 12 uses the retrieved second additional client data to retrieve third additional client data from the memory 22, the second party $P_2$, the second party data source 18, and/or a third party data source 19. The central server 12 is configured to retrieve the third additional client data using third key words from the second additional client data. The third key words can be different from the first key words and/or the second key words. In an embodiment, the central server 12 can use the first key words and/or the second key words with the third key words to retrieve the third additional client data. The third additional client data can include additional company names, names of related companies, names of members or employees, new addresses, etc. which were extracted from the second additional client data during step 104b.

In an embodiment, the central server 12 is configured to assign or adjust third reliability weights RWc to documents, websites or target data retrieved as part of or extracted from the third additional client data. In an embodiment, the third reliability weights RWc can be numbers between zero and one. The third reliability weights RWc can be lower than the second reliability weights RWb, for example, since they are based on information extracted from the second additional client data as opposed to initial client data entered by the user U or the first additional client data based thereon.

In an embodiment, the central server 12 is configured to cross-reference the third additional client data with the initial client data, the first additional client data, the second additional client data, and/or other third additional client data. The central server 12 is configured to find similarities between multiple documents or sources. The central server 12 is configured to increase a third reliability weight RWc based on the cross-referencing. For example, the central server 12 can assign a high third reliability weight RWc when documents or websites contain multiple items entered as initial client data or found in other first, second or third additional client data, whereas the central server 12 can assign a low third reliability weight RWc when documents or websites contain less items entered as initial client data or found in other first, second or third additional client data.

Thus, for example, a document or website that has the correct company name, address and employee can be assigned a higher third reliability weight RWc than a document or website with only the company name. The data used for cross-referencing can include the initial client data and/or other first, second or third additional client data. Thus, the central server 12 can find items in common in various documents or websites retrieved from an existing second party data source 18 and/or a third party data source 19 and increase corresponding third reliability weights RWc based thereon.

At step 206c, the central server 12 is configured to generate one or more third risk parameter RPc based on the third additional client data. As discussed above, the central server 12 generates the third risk parameter RPc based on the target data extracted from the third additional client data retrieved from one or more of the memory 22, the second party $P_2$, the existing second party data source 18, and/or the third party data source 19. In an embodiment, each third risk parameter RPc can correspond to a third reliability weight RWc and/or a third category weight CWa.

At step 208, the central server 12 determines the risk associated with accepting the second party $P_2$ as a client. In an embodiment, the central server 12 determines the risk based on the risk parameter RP as discussed above.

In an embodiment, the central server 12 is configured to use one or more risk parameter RP to calculate a total risk TR, as discussed above. In an embodiment, the central server 12 is configured to calculate the total risk TR as follows:

$$TR = \frac{(RPa \times Wa) + (RPb \times Wb) + (RPc \times Wc) + \ldots (RPn \times Wn)}{(n)} \quad \text{(Equation 2)}$$

In equation 1, Wa>Wb>Wc. Wa is a first reliability weight RWa or first category weight CWa; Wb is a second reliability weight RWb or second category weight CWb; Wc is a third reliability weight RWc or third category weight CWc. In this way, the information directly entered by the user U using the user terminal 14 receives the highest weight, while other information retrieved by the central server is still considered at varying degrees based on how close it relates to the original data entered by the user U.

In an embodiment, multiple risk parameters RP can be generated for each of one or more of the first additional client data, the second additional client data, and/or the third additional client data. For example, in the following equation 3, the first additional client data includes RP1 and RP2, the second additional client data includes RP3 and RP4, and the third additional client data is omitted for simplicity.

$$TR = \frac{(RP1 \times Wa) + (RP2 \times Wa) + (RP3 \times Wb) + (RP4 \times Wn)}{(n)} \quad \text{(Equation 3)}$$

In equation 3, n=4 and Wa>Wb.

The central server 12 is configured to then use the risk parameters RP or total risk TR as described above with respect to the method 200, for example, by approving or rejecting a second party $P_2$ as a client and/or enabling adjustment of various values at a user terminal 14.

The embodiments described herein provide improved systems and methods for client intake and management. By using the central server 12, retrieving data, and developing risk parameters RP and/or weights as discussed herein, processing speeds and accuracy can be increased and memory space can be conserved in comparison to other systems. Further, for business enterprises storing large amounts of data, the systems and methods enable use of the stored data beyond mere record maintenance as an existing second party source 18. It should be understood that various changes and modifications to the systems and methods described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Accordingly, these terms, as utilized to describe the present invention should be interpreted relative to a connecting device.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment, it is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A method for client intake and management by a first party, the method comprising:

presenting, on a user terminal, a user interface enabling a user to enter a name of a second party that is a potential client;

receiving, via the user interface, user input of initial client data including the name of the second party;

transmitting the initial client data from the user terminal to a central server including a memory storing an extraction algorithm including a neural network and a matter database;

searching the name of the second party in the matter database using a hierarchal searching system to calculate a risk assessment for the second party based at least partially on past hierarchal searching results;

determining a conflict rating code based on subsequent search results from the searching the name of the second party and the past hierarchal searching results;

determining a litigiousness factor weighted as part of the risk assessment for the second party by matching the user input of initial client data against the matter database on the central server;

in response to not finding the name of the second party in the matter database, retrieving a document or website including additional client data regarding the second party from an existing second party database or a third party data source;

based on classification of the document or website, using the extraction algorithm including the neural network to extract target data from the additional client data based on x and y coordinates defining a location on the document or website;

receiving input regarding whether the target data at the x and y coordinates is accurate;

when the input indicates that the extracted target data is accurate, using the extracted target data to further train the extraction algorithm including the neural network as a positive example of a location of x and y coordinates where target information is found on the classified document or website;

when the input indicates that the extracted target data is not accurate, using the extracted target data to further train the extraction algorithm including the neural network as a negative example of the location of x and y coordinates where target information is found on the classified document or website;

generating at least one risk parameter based on the target data;

determining a risk associated with the second party based on the at least one risk parameter;

updating the conflict rating code; and presenting the risk to the user using the user interface of the user terminal.

2. The method of claim 1, wherein retrieving additional client data includes retrieving additional client data from the existing second party database.

3. The method of claim 1, wherein retrieving additional client data includes retrieving additional client data from the third party data source.

4. The method of claim 1, comprising generating the at least one risk parameter includes using at least one reliability weight.

5. The method of claim 4, comprising adjusting the at least one reliability weight based on cross-referencing the additional client data and the initial client data.

6. The method of claim 1, wherein generating the at least one risk parameter includes using at least one category weight.

7. The method of claim 1, wherein the at least one risk parameter includes a numerical value.

8. The method of claim 1, wherein approving or rejecting the second party as a client based on the at least one risk parameter.

9. A system for client intake and management by a first party, the system comprising:

at least one user terminal including a user input device configured to receive initial client data regarding a second party, the at least one user terminal configured to present a user interface enabling a user to enter a name of a second party that is a potential client; and a central server including a processor and a memory, the memory storing an extraction algorithm including a neural network and a matter database, the processor programmed to execute instructions stored on the memory to cause the central server to: (i) receive the initial client data including the name of the second party from the at least one user terminal; (ii) searching the name of the second party in the matter database using a hierarchal searching system of conflict rating codes to calculate a risk assessment for the second party based at least partially on past hierarchal searching results; (iii) in response to not finding the name of the second party in the matter database, retrieve a document or website including additional client data regarding the second party from an existing second party database or a third party data source; (iv) based on classification of the document or website, using the extraction algorithm including the neural network to extract target data from the additional client data based on x and y coordinates defining a location on the document or website; (v) receive input regarding whether the target data at the x and y coordinates is accurate; (vi) when the input indicates that the extracted target data is accurate, use the extracted target data to further train the extraction algorithm including the neural network as a positive example of a location of x and y coordinates where target information is found on the classified document or website; (vii) when the input indicates that the extracted target data is not accurate, using the extracted target data to further train the extraction algorithm including the neural network as a negative example of the location of x and y coordinates where target information is found on the classified document or website; (viii) generate at least one risk parameter based on the target data; (ix) determine a risk associated with the second party based on the at least one risk parameter; (x) update a conflict rating code; and (xi) cause the risk to be presented to the user using the user interface of the at least one user terminal.

10. The system of claim 9, wherein
the processor is programmed to retrieve the additional client data from the existing second party database.

11. The system of claim 9, wherein
the processor is programmed to retrieve the additional client data from the third party data source.

12. The system of claim 9, wherein
the processor is programmed to generate the at least one risk parameter using at least one reliability weight.

13. The system of claim 12, wherein
the processor is programmed to adjust the at least one reliability weight based on cross-referencing the additional client data and the initial client data.

14. The system of claim 9, wherein
the processor is programmed to generate the at least one risk parameter using at least one category weight.

15. The system of claim 9, wherein
the at least one risk parameter includes a numerical value.

16. The system of claim 9, wherein
the processor is programmed to approve or reject the second party as a client based on the risk parameter.

* * * * *